(12) United States Patent
Oh et al.

(10) Patent No.: US 9,471,484 B2
(45) Date of Patent: Oct. 18, 2016

(54) FLASH MEMORY CONTROLLER HAVING DUAL MODE PIN-OUT

(71) Applicant: NovaChips Canada Inc.

(72) Inventors: HakJune Oh, Ottawa (CA); Jin-Ki Kim, Ottawa (CA); Young Goan Kim, Seoul (KR); Hyun Woong Lee, Seoul (KR)

(73) Assignee: Novachips Canada Inc., Ottawa (CA)

( * ) Notice: Subject to any disclaimer, the term of this patent is extended or adjusted under 35 U.S.C. 154(b) by 0 days.

(21) Appl. No.: 13/835,968

(22) Filed: Mar. 15, 2013

(65) Prior Publication Data

US 2014/0082260 A1    Mar. 20, 2014

Related U.S. Application Data

(60) Provisional application No. 61/702,846, filed on Sep. 19, 2012, provisional application No. 61/713,008, filed on Oct. 12, 2012.

(51) Int. Cl.
| | | |
|---|---|---|
| G06F 13/16 | (2006.01) | |
| G06F 12/02 | (2006.01) | |
| G06F 13/38 | (2006.01) | |

(52) U.S. Cl.
CPC ....... *G06F 12/0246* (2013.01); *G06F 13/1668* (2013.01); *G06F 13/1694* (2013.01); *G06F 13/385* (2013.01)

(58) Field of Classification Search
CPC ............. G06F 12/0246; G06F 3/0679; G06F 2212/2022; G06F 2212/7211; G06F 12/385; G06F 13/16; G06F 13/1668; G06F 13/1694; G11C 16/102

USPC .................................. 710/11; 711/120, 149
See application file for complete search history.

(56) References Cited

U.S. PATENT DOCUMENTS

| | | | |
|---|---|---|---|
| 4,723,120 A | 2/1988 | Petty, Jr. | |
| 4,914,574 A | 4/1990 | Terada | |
| 5,357,621 A | 10/1994 | Cox | |
| 5,404,460 A | 4/1995 | Thomsen | |

(Continued)

FOREIGN PATENT DOCUMENTS

| | | |
|---|---|---|
| KR | 100579053 | 5/2006 |
| KR | 1020080042850 | 5/2008 |

OTHER PUBLICATIONS

"Multi-Slot Main Memory System for Post DDR3," Jaejun Lee, Sungho Lee, and Sangwook Nam, IEEE Transactions on Circuits and Systems—II: Express Briefs, vol. 57, No. 5, May 2010.*

(Continued)

*Primary Examiner* — Farley Abad
(74) *Attorney, Agent, or Firm* — Borden Ladner Gervais LLP; Shin Hung

(57) ABSTRACT

A memory controller of a data storage device, which communicates with a host, is configurable to have at least two different pinout assignments for interfacing with respective different types of memory devices. Each pinout assignment corresponds to a specific memory interface protocol. Each memory interface port of the memory controller includes port buffer circuitry configurable for different functional signal assignments, based on the selected memory interface protocol to be used. The interface circuitry configuration for each memory interface port is selectable by setting a predetermined port or registers of the memory controller.

15 Claims, 15 Drawing Sheets

(56) References Cited

U.S. PATENT DOCUMENTS

| | | |
|---|---|---|
| 5,430,859 A | 7/1995 | Norman |
| 5,546,023 A | 8/1996 | Borkar |
| 5,778,419 A | 7/1998 | Hansen |
| 5,860,083 A | 1/1999 | Sukegawa |
| 5,929,655 A | 7/1999 | Roe |
| 6,072,804 A | 6/2000 | Beyers, Jr. |
| 6,144,576 A | 11/2000 | Leddige |
| 6,253,292 B1 | 6/2001 | Jhang |
| 6,271,679 B1 | 8/2001 | McClintock |
| 6,373,289 B1 | 4/2002 | Martin |
| 6,381,223 B1 | 4/2002 | Olpe |
| 6,480,026 B2 | 11/2002 | Andrews |
| 6,625,687 B1 | 9/2003 | Halbert |
| 6,654,307 B2 | 11/2003 | Widmer |
| 6,658,509 B1 | 12/2003 | Bonella |
| 6,877,079 B2 | 4/2005 | Yoo |
| 6,901,457 B1* | 5/2005 | Toombs et al. ............... 710/11 |
| 6,917,546 B2 | 7/2005 | Matsui |
| 7,017,002 B2 | 3/2006 | Perego |
| 7,031,221 B2 | 4/2006 | Mooney |
| 7,093,076 B2 | 8/2006 | Kyung |
| 7,111,108 B2 | 9/2006 | Grundy |
| 7,138,823 B2 | 11/2006 | Janzen |
| 7,221,613 B2 | 5/2007 | Pelley |
| 7,242,635 B2 | 7/2007 | Okuda |
| 7,308,524 B2 | 12/2007 | Grundy |
| 7,421,030 B2* | 9/2008 | Bolinth et al. ............... 375/260 |
| 7,432,528 B2 | 10/2008 | Chou |
| 7,475,174 B2 | 1/2009 | Chow |
| 7,515,174 B1 | 4/2009 | Francisco |
| 7,515,471 B2 | 4/2009 | Oh |
| 7,529,149 B2 | 5/2009 | Pyeon |
| 7,533,311 B2 | 5/2009 | Tran |
| 7,551,492 B2 | 6/2009 | Kim |
| 7,554,855 B2 | 6/2009 | Kim |
| 7,586,341 B2 | 9/2009 | Wang |
| 7,603,534 B2 | 10/2009 | Roohparvar |
| 7,631,245 B2 | 12/2009 | Lasser |
| 7,650,459 B2 | 1/2010 | Eilert |
| 7,652,922 B2 | 1/2010 | Kim |
| 7,688,652 B2 | 3/2010 | Oh |
| 7,719,892 B2 | 5/2010 | Kim |
| 7,752,364 B2 | 7/2010 | Oh |
| 7,757,037 B2 | 7/2010 | Chen |
| 7,865,756 B2 | 1/2011 | Oh |
| 7,885,140 B2 | 2/2011 | Gillingham |
| 7,888,966 B1 | 2/2011 | Davidson |
| 7,889,578 B2 | 2/2011 | Schuetz |
| 7,904,639 B2 | 3/2011 | Kim |
| 7,908,429 B2 | 3/2011 | Pyeon |
| 7,913,033 B2 | 3/2011 | Roohparvar |
| 7,916,557 B2 | 3/2011 | Abedifard |
| 7,919,846 B2 | 4/2011 | Hembree |
| 7,920,431 B2 | 4/2011 | Nobunaga |
| 7,925,854 B2 | 4/2011 | Oh |
| 7,966,446 B2 | 6/2011 | Choi |
| 7,978,516 B2 | 7/2011 | Olbrich |
| 7,983,099 B2 | 7/2011 | Kim |
| 8,010,709 B2 | 8/2011 | Pyeon |
| 8,046,527 B2 | 10/2011 | Pyeon |
| 8,078,848 B2 | 12/2011 | Asnaashari |
| 8,086,785 B2 | 12/2011 | Pyeon |
| 8,094,511 B2 | 1/2012 | Lee |
| 8,103,920 B2 | 1/2012 | Nagadomi |
| 8,134,852 B2 | 3/2012 | Kim |
| 8,139,390 B2 | 3/2012 | Oh |
| 8,144,528 B2 | 3/2012 | Oh |
| 8,145,925 B2 | 3/2012 | Oh |
| 8,149,862 B1* | 4/2012 | Forrest et al. ............... 370/445 |
| 8,151,051 B2 | 4/2012 | Cleveland |
| 8,159,889 B2 | 4/2012 | Ryu |
| 8,161,313 B2 | 4/2012 | Oh |
| 8,161,354 B2 | 4/2012 | Chen |
| 8,176,237 B2 | 5/2012 | Yano |
| 8,181,056 B2 | 5/2012 | Oh |
| 8,200,894 B2 | 6/2012 | Klein |
| 8,200,925 B2 | 6/2012 | Oh |
| 8,214,579 B2 | 7/2012 | Mitsunaga |
| 8,244,937 B2 | 8/2012 | Klein |
| 8,250,271 B2 | 8/2012 | Swing |
| 8,397,013 B1 | 3/2013 | Rosenband et al. |
| 2002/0122347 A1 | 9/2002 | Frulio |
| 2003/0056050 A1* | 3/2003 | Moro ............... 710/301 |
| 2005/0193161 A1 | 9/2005 | Lee |
| 2005/0193302 A1* | 9/2005 | Arguelles et al. ............... 714/733 |
| 2005/0251593 A1* | 11/2005 | Lin et al. ............... 710/62 |
| 2006/0031593 A1 | 2/2006 | Sinclair |
| 2006/0036827 A1 | 2/2006 | Dell |
| 2007/0005831 A1 | 1/2007 | Gregorius |
| 2007/0058480 A1 | 3/2007 | Hwang |
| 2007/0064629 A1 | 3/2007 | Regev |
| 2007/0076479 A1 | 4/2007 | Kim |
| 2007/0106836 A1 | 5/2007 | Lee |
| 2007/0109833 A1 | 5/2007 | Pyeon |
| 2007/0143677 A1 | 6/2007 | Pyeon |
| 2007/0153576 A1 | 7/2007 | Oh |
| 2007/0165457 A1 | 7/2007 | Kim |
| 2007/0210174 A1* | 9/2007 | Deprun et al. ............... 235/492 |
| 2007/0233903 A1 | 10/2007 | Pyeon |
| 2007/0233917 A1 | 10/2007 | Pyeon |
| 2007/0234071 A1 | 10/2007 | Pyeon |
| 2007/0245061 A1 | 10/2007 | Harriman |
| 2007/0258295 A1 | 11/2007 | Kagan |
| 2008/0016269 A1* | 1/2008 | Chow et al. ............... 711/103 |
| 2009/0043946 A1 | 2/2009 | Webb |
| 2009/0063761 A1* | 3/2009 | Gower et al. ............... 711/105 |
| 2009/0083476 A1 | 3/2009 | Pua |
| 2009/0094406 A1 | 4/2009 | Ashwood |
| 2009/0154284 A1 | 6/2009 | Oh |
| 2009/0168525 A1 | 7/2009 | Olbrich |
| 2009/0172261 A1 | 7/2009 | Prins |
| 2009/0300273 A1 | 12/2009 | Chen |
| 2009/0319716 A1 | 12/2009 | Nagadomi |
| 2010/0011174 A1 | 1/2010 | Oh |
| 2010/0014365 A1 | 1/2010 | Cho |
| 2010/0023800 A1 | 1/2010 | Harari |
| 2010/0082881 A1 | 4/2010 | Klein |
| 2010/0161914 A1* | 6/2010 | Eilert et al. ............... 711/154 |
| 2010/0162037 A1* | 6/2010 | Maule ............... G06F 11/106 |
| | | 714/5.11 |
| 2010/0287329 A1* | 11/2010 | Toelkes et al. ............... 711/103 |
| 2011/0078336 A1 | 3/2011 | Radke |
| 2011/0096614 A1 | 4/2011 | Schuetz |
| 2011/0099320 A1 | 4/2011 | Lucas |
| 2011/0161554 A1 | 6/2011 | Selinger |
| 2011/0173380 A1 | 7/2011 | Yano |
| 2011/0194365 A1 | 8/2011 | Kim |
| 2011/0235426 A1 | 9/2011 | Oh |
| 2011/0258366 A1 | 10/2011 | Schuetz |
| 2011/0264846 A1 | 10/2011 | Oh |
| 2011/0276740 A1 | 11/2011 | Joo |
| 2011/0276775 A1 | 11/2011 | Schuetz |
| 2011/0289262 A1 | 11/2011 | Kim |
| 2011/0307646 A1 | 12/2011 | Lee |
| 2012/0072647 A1* | 3/2012 | Lee et al. ............... 711/103 |
| 2012/0215969 A1 | 8/2012 | Tamura |
| 2012/0221771 A1* | 8/2012 | Yoon et al. ............... 711/103 |

OTHER PUBLICATIONS

"The state of DDR4," Matthew Murray, Feb. 2012.*
"256Gb HyperLink NAND (HLNAND) Flash", HL7G256G24DBBA-1WSA, Mosaid Technologies Incorporated, Version 0.3, Feb. 17, 2012, 123 pages.
"A 50nm 8Gb NAND Flash Memory with 100MB/s Program Throughput and 200MB/s DDR Interface", ISSCC Paper Session 23.4, Feb. 6, 2008, pp. 426-428.
"A 159mm2 32nm 32Gb MLC NAND-Flash Memory with 200MB/s Asynchronous DDR Interface", ISSCC paper Session 24.6, Feb. 10, 2010, pp. 442-443.
Toshiba Corporation, "Toshiba MOS Digital Integrated Circuit Silicon Gate CMOS", TH58NVG1S3AFT05, May 19, 2003, pp. 1-32.

(56) References Cited

OTHER PUBLICATIONS

"NAND Flash Applications Design Guide", Revision 1.0, Toshiba America Electronics Components, Inc., Apr. 2003, pp. 1-29.
Takeuchi et al., "A 56-nm CMOS 99-mm2 8-Gb Multi-Level NAND Flash Memory With 10-MB/s Program Throughput", IEEE Journal of Solid-State Circuits, Jan. 2007, vol. 42, No. 1, pp. 219-229.
"4Gb, 8Gb, and 16Gb ×8 NAND Flash Memory", Micron, Revision B, Feb. 2007, pp. 1-81.
Intel, "Enabling Platform Non-Volatile Memory Solutions", Presentation Material, Intel Developer Forum, 2007, 38 pages.
"ONFi Breaks Speed Barrier for NAND Flash", ONFi, online article, published at least as early as Nov. 14, 2007, 3 pages.
"Open NAND Flash Interface Specification", ONFi, Revision 3.0, Mar. 9, 2011, 288 pages.
"Open NAND Flash Interface Specification", ONFi, Revision 2.1, Jan. 14, 2009, 206 pages.
"Open NAND Flash Interface Specification", ONFi, Revision 2.2, Oct. 7, 2009, 216 pages.
"Open NAND Flash Interface Specification", ONFi, Revision 1.0, Dec. 28, 2006, 106 pages.
"Open NAND Flash Interface Specification", ONFi, Revision 2.0, Feb. 27, 2008, 174 pages.
"IEEE Standard for High-Bandwidth Memory Interface Based on Scalable Coherent Interface (SCI) Signaling Technology (RamLink)", IEEE Std 1596.4, 1996, 98 pages.
Gjessing et al., "RamLink: A High-Bandwidth Point-to-Point Memory Architecture", IEEE, Feb. 24-28, 1992, pp. 328-331.
Gjessing et al., "A RAM link for high speed" IEEE Spectrum, Oct. 1992, pp. 52-53.
Gjessing et al., "Performance of the RamLink Memory Architecture", Performance of the Twenty-Seventh Annual Hawaii International Conference on System Sciences, Jan. 4-7, 1994, pp. 154-162.
Diamond, "SyncLink: High-Speed DRAM for the future", Micro Standards, Dec. 1996, pp. 74-75.
Oshima et al., "High Speed Memory Architectures for multimedia applications", Circuits & Devices, Jan. 1997, vol. 13, Issue 1, pp. 8-13.
"ONFi Standards and What they Mean to Designers", ONFi, Flash Memory Circuit, Santa Clara, California, USA, Aug. 2008, 22 pages.
Gillingham, "Reducing System Power With a New NAND Flash Memory Interface", Jan. 19, 2009, 4 pages.
"HyperLink NAND (HLNAND) Flash Specification, HL1-200/HL1-266", Version: 1.61, May 25, 2007, pp. 1-83.
Microsoft WinHEC, "The Future of Memory and Storage: Closing the Gaps", Apr. 23, 2007, 48 pages.

\* cited by examiner

FLASH MEMORY CONTROLLER HAVING DUAL MODE PIN-OUT

CROSS REFERENCE TO RELATED APPLICATIONS

This application claims the benefit of U.S. Provisional Patent Application No. 61/702,846, filed on Sep. 19, 2012, and of U.S. Provisional Patent Application No. 61/713,008, filed on Oct. 12, 2012, which are hereby incorporated by reference.

FIELD

The present disclosure relates generally to memory systems. More particularly, the present application relates to non-volatile memory controllers.

BACKGROUND

Today, many electronic devices include memory systems that are used to store information (data) utilized by the devices. For example, some digital audio players include memory systems that are used to store digitized audio that may be played by the players. Likewise, personal computer systems often employ memory systems to store software utilized by the computer systems.

In many electronic devices, memory systems often comprise a controller and one or more memory devices. The controller typically contains circuitry configured to generate signals that are used to direct the memory devices to store and retrieve information. The memory devices typically store the information in memory that is contained in the memory devices. The memory may be volatile or non-volatile. A memory device that contains volatile memory often loses the stored information when power is removed from the device. A memory device containing non-volatile memory often retains the stored information even when power is removed from the device.

In certain conventional memory systems, data and control signals are transferred between the controller and memory devices in parallel using a parallel bus. Often, many wires are used to implement the bus and, depending on the layout of the memory system, the wires may extend for some length.

Electronic equipment uses semiconductor devices, such as, for example, memory devices. Memory devices may include random access memories (RAMs), flash memories (e.g., NAND flash device, NOR flash device), and other types of memories for storing data or information. Memory devices can be combined to form as a storage device (e.g., a solid state drive (SSD)).

SUMMARY

According to a first aspect of the present disclosure, there is provided a dual interface memory controller. The dual interface memory controller includes a memory interface and a host interface. The memory interface includes at least one memory interface port including circuitry configured to buffer at least a first signal compatible for communicating in a first memory interface protocol or a second signal compatible for communicating in a second memory interface protocol different than the first memory interface protocol. The host interface includes host interface ports for communicating information between a host device and the memory interface. According to one embodiment, the first memory interface protocol is an ONFi memory interface protocol and the second memory interface protocol is an HLNAND memory interface protocol. According to an embodiment of the first aspect, the dual interface memory controller further includes mode selector circuitry for enabling the first signal path or the second signal path in response to an applied voltage level. In this embodiment, there is further included a pad electrically coupled to the mode selector circuitry for receiving the applied voltage level. In this embodiment, the circuitry includes a first signal path configured to buffer the first signal, and a second signal path configured to buffer the second signal. The at least one memory interface port can include a single pad, and the first signal path includes input circuitry configured for receiving an input signal corresponding to the first memory interface protocol from the single pad.

In one aspect of the present embodiment, the input circuitry is first input circuitry and the second signal path includes second input circuitry configured for receiving another input signal corresponding to the second memory interface protocol from the single pad. The dual interface memory controller can further include a selector circuit for selectively coupling the single pad to one of the first input circuitry or the second input circuitry in response to a selection signal having one of a first logic state and a second logic state provided by the mode selector circuitry. In another aspect of the present embodiment, the second signal path includes output circuitry configured for providing an output signal corresponding to the second memory interface protocol to the single pad, and the circuitry includes a third signal path configured to buffer a third signal, the third signal corresponding to the first memory interface protocol. In this embodiment, the third signal path includes output circuitry configured for providing an output signal corresponding to the memory interface protocol to the single pad. Furthermore, the at least one memory interface port can include an output driver enabled by the selection signal at the first logic state for driving the single pad with the output signal, and the selector circuit couples the single pad to the second input circuitry when the selection signal is at the first logic state.

In another embodiment of the present aspect, the first signal path includes output circuitry configured for providing an output signal corresponding to the first memory interface protocol to the single pad. The output circuitry is first output circuitry and the second signal path includes second output circuitry configured for providing another output signal corresponding to the second memory interface protocol to the single pad. The dual interface memory controller can further include a selector circuit for selectively coupling the single pad to one of the first output circuitry or the second output circuitry in response to a selection signal having one of a first logic state and a second logic state provided by the mode selector circuitry.

According to a second aspect of the present disclosure, there is provided a non-volatile memory system including a memory controller and at least one memory. The memory controller includes a channel control module having at least one input/output port configured with circuitry for buffering signals corresponding to one of a first memory interface protocol pinout and a second memory interface protocol pinout in response to requests from a host device. The at least one memory has either the first memory interface protocol pinout or the second memory interface protocol pinout in communication with the channel control module through the at least one input/output port. In one embodiment of the second aspect, there is further included a channel for electrically connecting the at least one input/output port to the at least one memory device. In this embodiment, the at least one memory includes at least two memory chips connected in parallel to the channel. Alternately, the at least one memory includes at least two memory chips connected in series in a ring topology configuration with the channel control module. According to another embodiment of the second aspect, the first memory interface protocol pinout corresponds to an ONFi memory interface pinout and the second memory interface protocol pinout corresponds to an HLNAND memory interface pinout.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a memory controller for a data storage device, where the memory controller is configurable to have at least two different pinout assignments for interfacing with respective different types of memory devices. Each pinout assignment corresponds to a specific memory interface protocol. Each memory interface port of the memory controller includes interface circuitry configurable for different functional signal assignments, based on the selected memory interface protocol to be used. The interface circuitry configuration for each memory interface port is selectable by setting a predetermined port or registers of the memory controller.

Flash memory is a commonly used type of non-volatile memory in widespread use as mass storage for consumer electronics, such as digital cameras and portable digital music players for example. Such flash memory take the form of memory cards or universal serial bus (USB) type memory sticks, each having at least one memory device and a memory controller formed therein. Another mass storage application is solid state drives (SSD) which can be used as replacements for computer hard disk drives. These solid state drives can be used in computer workstations, networks, and for virtually any application in which large amounts of data need to be stored.

Figure 1:
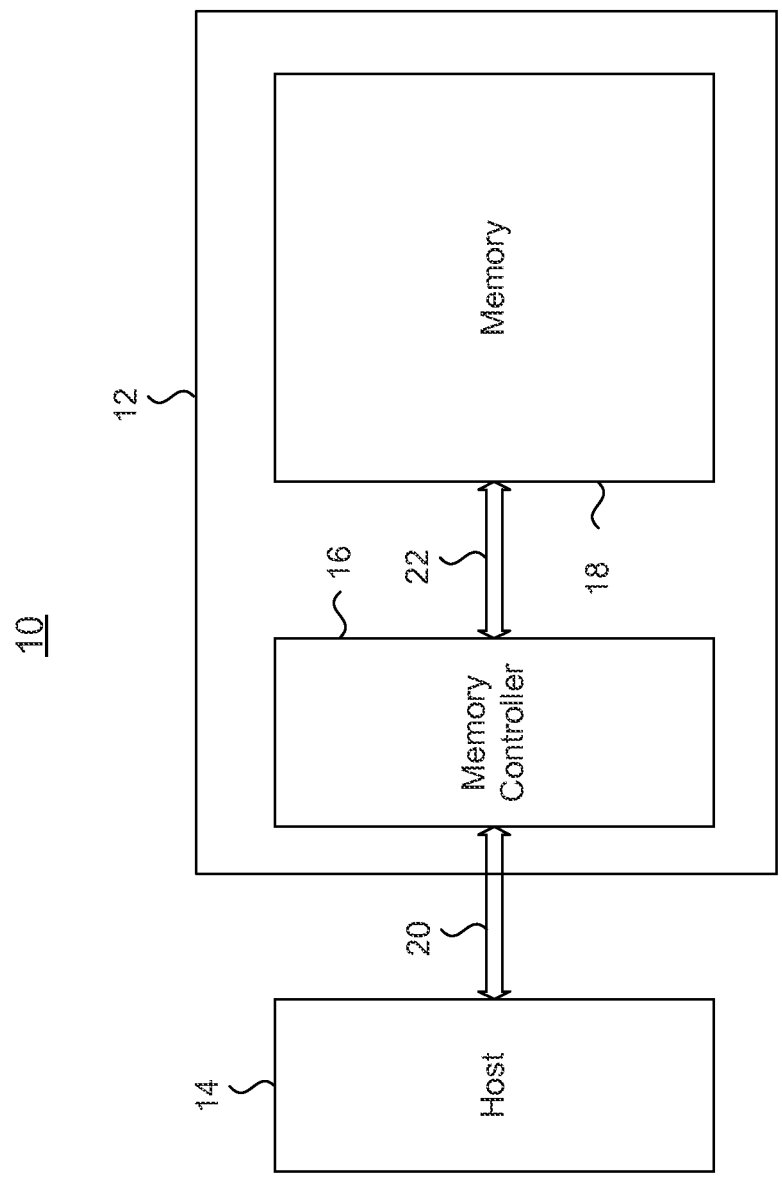
FIG. 1 is a block diagram of a memory system to which embodiments of the present disclosure are applied.

FIG. 1 depicts a system, such as, for example, a non-volatile memory system to which embodiments of the present disclosure are applied. Referring to FIG. 1, a non-volatile memory system 10 includes data storage device 12 and a host 14 as an external device or apparatus. A non-limiting example of the data storage device 12 is a solid state drive (SSD). A non-limiting example of the host 14 is a computer or other computing system.

The data storage device 12 includes a memory controller 16 and memory 18. The memory 18 includes volatile memory devices, or non-volatile memory devices such as, for example, flash memory devices. The memory 18 may include a traditional rotating magnetic storage disk. The host 14 is coupled with the data storage device 12 via an interface protocol bus 20 and communicates with the memory controller 16 using an interface protocol. The interface protocol includes, for example, the peripheral component interconnect-express (PCI-E) protocol, advanced technology attachment (ATA) protocol, serial ATA (SATA) protocol, parallel ATA (PATA) protocol, or serial attached SCSI (SAS) protocol. However, the interface protocol between the host 14 and the data storage device 12 is not restricted to the above examples and may include other interface protocols, such as universal serial bus (USB) protocol, multi-media card (MMC) protocol, enhanced small disk interface (ESDI) protocol, integrated drive electronics (IDE) protocol or the like. The interface protocol bus 20 transfers data and commands between the host 14 and the memory controller 16, and has the form of pins, ports and other physical interfaces. The data storage device 12 may have any type of form factor, including a conventional HDD (Hard Disk Drive) form factor, PCIe PCB card form factor, plug-in module (e.g. DIMM) form factor or in a portable memory card (e.g., a secure digital (SD) card or an MMC) form factor, for example.

The memory 18 includes at least one NAND flash memory device, for example, but is not limited to NAND flash memory in this illustrative configuration. The memory 18 may include phase-change random access memory (PCRAM), magneto-resistive RAM (MRAM), resistive RAM (ReRAM), ferroelectric RAM (FeRAM), or other types of memories. When the memory 18 is a flash memory device, it may be a NAND flash memory device using floating-gate technology or charge trap flash (CTF) technology, for example.

The memory controller 16 is coupled with a memory protocol bus 22. The memory controller 16 includes an interface for communicating commands and data with the memory 18 using a memory protocol. Depending on the specific type of memory being used as memory 18 in data storage device 12, a specific protocol native to the specific type of memory is used. Accordingly, the memory controller 16 is configured to communicate with the memory 18 using the specific protocol dictated by the type of memory 18 being used. For example, each of the different types of previously mentioned non-volatile memories may have a different communication protocol, in which command operation codes may differ, the types of control signals may differ, and the data format may differ. In short, the communication protocols of different memories are incompatible with each other. Therefore, different memory controllers are required for interfacing with different types of memory 18 used in the data storage device 12. The cost for manufacturers of data storage device 12 thus increases as they must use different memory controllers 16 each configured to communicate with a specific type of memory 18. Hence the risk to manufacturers of data storage devices increases if one particular type of data storage device 12 falls into disfavor with consumers, or the specific type of memory 18 is no longer produced.

Memory controllers for data storage devices use ports, such as physical pins for example, to electrically couple signals with a host device and with at least one memory device. Memory controllers for solid state storage devices, such as USB memory sticks and SSD typically have multiple channels, where each channel is electrically connected to at least one memory device.

Figure 2A:
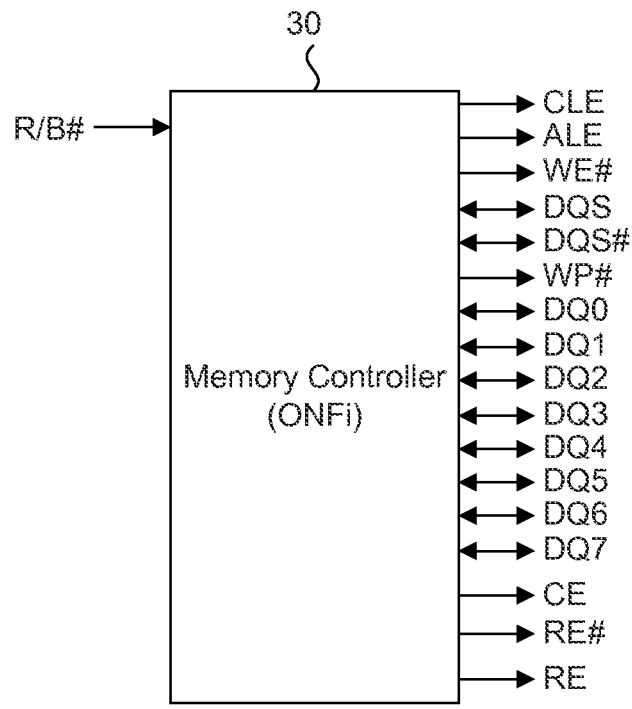
FIG. 2A is a block diagram showing functional pinouts of a first type of memory controller.

FIG. 2A shows the functional pinout of a memory controller 30 configured for the ONFi memory interface protocol, which is one example of a specific memory interface protocol. In the example of FIG. 2A, the ports for one channel are shown. Table 1 provides signal descriptions for the ports shown in FIG. 2A.

TABLE 1

| Pin Name | Type | Description |
| --- | --- | --- |
| CE# | Output | Chip Enable: The Chip Enable signal selects the target NAND flash chip. When Chip Enable is high and the target is in the ready state, the target goes into a low-power standby state. When Chip Enable is low, the target is selected. |
| CLE | Output | Command Latch Enable: The Command Latch Enable signal controls the target NAND flash chip to load a command from DQ[0:7] into its command register. |
| ALE | Output | Address Latch Enable: The Address Latch Enable signal controls the target NAND flash chip to load an address from DQ[0:7] into its address register. |
| WE# | Output | Write Enable The Write Enable signal controls the latching of commands, addresses, and input data. Data, commands, and addresses are latched on the rising edge of WE#. |
| RE | Output | Read Enable True The Read Enable (True) signal enables data output on DQ[0:7]. |
| RE# | Output | Read Enable Complement The Read Enable Complement signal is the complementary signal to Read Enable True. Specifically, Read Enable Complement has the opposite value of Read Enable True when CE# is low, i.e., if RE is high then RE# is low; if RE is low then RE# is high. |
| DQ[0:7] | I/O | Data Input/Output: DQ[0:7] The DQ port is an 8-bit wide bidirectional port for transferring address, command, and data to and from the device. |
| DQS | I/O | DQ Data Strobe True: DQS is a data strobe signal providing synchronous reference for data input. The data strobe signal that indicates the data valid window. |
| DQS# | I/O | DQ Data Strobe Complement The Data Strobe Complement signal is the complementary signal to Data Strobe True, optionally used in the NV-DDR2 data interface. Specifically, Data Strobe Complement has the opposite value of Data Strobe True when CE# is low, i.e. if DQS is high then DQS# is low; if DQS is low then DQS# is high. |
| WP# | Output | Write Protect: Protects against inadvertent PROGRAM and ERASE operations. All PROGRAM and ERASE operations are disabled when WP# is LOW. |
| R/B# | Input | Ready/Busy: The Ready/Busy signal indicates the target status. When low, the signal indicates that one or more LUN operations are in progress. This signal is an open drain output and requires an external pull-up. |

In the presently shown example, 8 ports are required for the 8-bit wide data signals, and 9 ports are required for carrying control signals required for enabling operation of an ONFi flash memory device. Therefore a total of 17 ports are required for the channel to be connected to at least one ONFi flash memory device. If the memory controller 30 included 8 channels, then the memory controller 30 requires at least 8×17=136 ports. This excludes the ports required for interfacing with the host system.

Figure 2B:
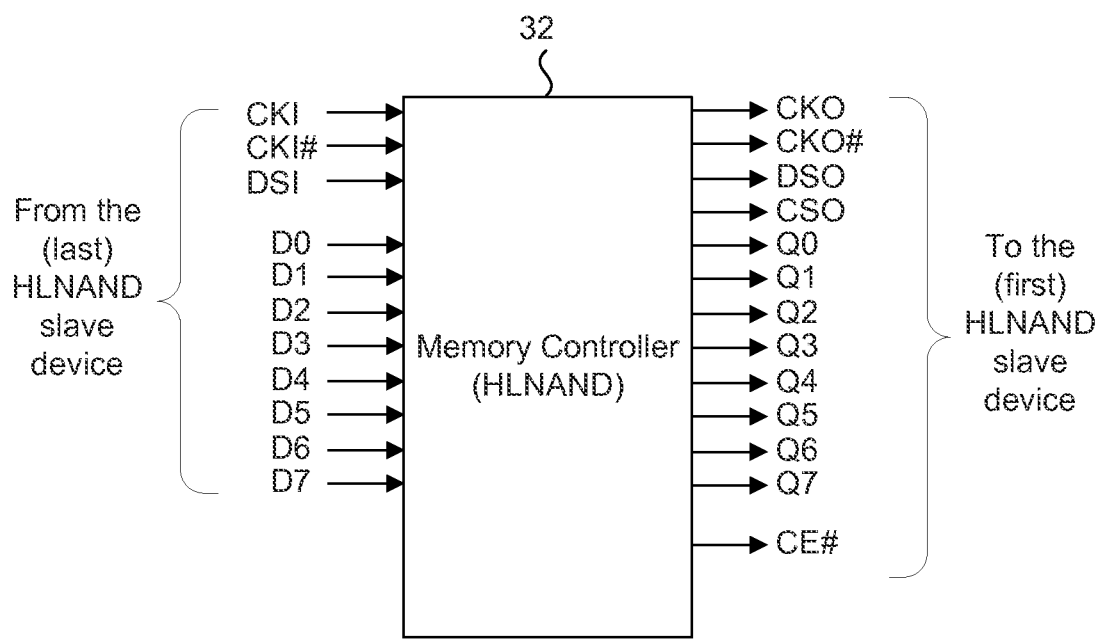
FIG. 2B is a block diagram showing functional pinouts of a second type of memory controller.

FIG. 2B shows the functional pinout of a memory controller 32 configured for another type of memory device operating in another protocol, which is one example of a selected memory interface protocol. One example of a selected memory interface protocol is HLNAND™ memory interface protocol. Memory devices may operate in another type of memory interface protocol. In the example of FIG. 2B, the ports for one channel are shown. Table 2 provides signal descriptions for the ports shown in FIG. 2A.

TABLE 2

| Pin Name | Type | Description |
|---|---|---|
| CKI/CKI# | Input | Clock: CKI and CKI# are the clock inputs from the (last) HLNAND ™ device. CKI and CKI# are differential signals. All incoming command, address, read-out data from the (last) HLNAND device are referenced to the crossing edges of CKI and CKI# in both directions. |
| CKO/ CKO# | Output | Clock: CKO and CKO# are differential clock outputs. All outgoing command, address, and data are referenced to the crossing edges of CKO and CKO#. |
| CE# | Output | Chip Enable: When CE# is LOW, the device is enabled. Once device becomes "BUSY", CE# pin should be LOW until the device becomes "READY". In addition, CE# LOW activates and CE# HIGH deactivates the internal clock signals. |
| D[7:0] | Input | Data Input: D[7:0] receive read-out data from the (last) HLNAND device when DSI is HIGH and referenced to the crossing edges of CKI and CKI# in both directions. |
| Q[7:0] | Output | Data Output: Q[7:0] transmit command and/or address packet along with CSO, and transmit write data along with DSO during write operation. |
| CSO | Output | Command Strobe Output: When CSO is HIGH, command, address and/or write data through D[7:0] are latched on the crossing of CKI and CKI# by the device. When CSO is LOW, the device ignores input signals from D[7:0]. CSO is used with command and address packets only. |
| CSI | Input | Command Strobe Input: Echo signal of CSO. May not be used by the controller in certain cases. |
| DSI | Input | Data Strobe Input: Echo signal of DSO. DSI is referenced to the crossing edges of CKO and CKO# and delineates the valid read-out data on D[7:0] pins from the Q[7:0] pins of the (last) HLNAND device. |
| DSO | Output | Data Strobe Output: After READ-group commands, DSO enables the Q[7:0] buffer of the selected HLNAND device when HIGH. When DSO is LOW and CSO is LOW, the Q[7:0] buffer of the selected HLNAND device holds the previous states. After WRITE-group commands and DSO is HIGH, write data packets through Q[7:0] are transmitted to the (first) HLNAND device and shall be latched by the selected device on the crossing of CKI and CKI#. |

In the presently shown example, 8 ports are required for the Q0-Q7 data output, 8 ports are required for the D0-D7 data input, and 8 ports are required for carrying control signals required for enabling operation of an HLNAND flash memory device. Therefore a total of 24 ports are required for the channel to be connected to at least one HLNAND flash memory device. If the memory controller 32 included 8 channels, then the memory controller 32 requires at least 8×24=192 ports. This excludes the ports required for interfacing with the host system.

While certain signal names and functions of the ONFi and HLNAND memory interface protocols may appear similar to each other, the manner in which they are used and the manner in which the memory devices are interconnected with the memory controller are very different from each other. This difference is illustrated in FIGS. 3A and 3B.

Figure 3A:
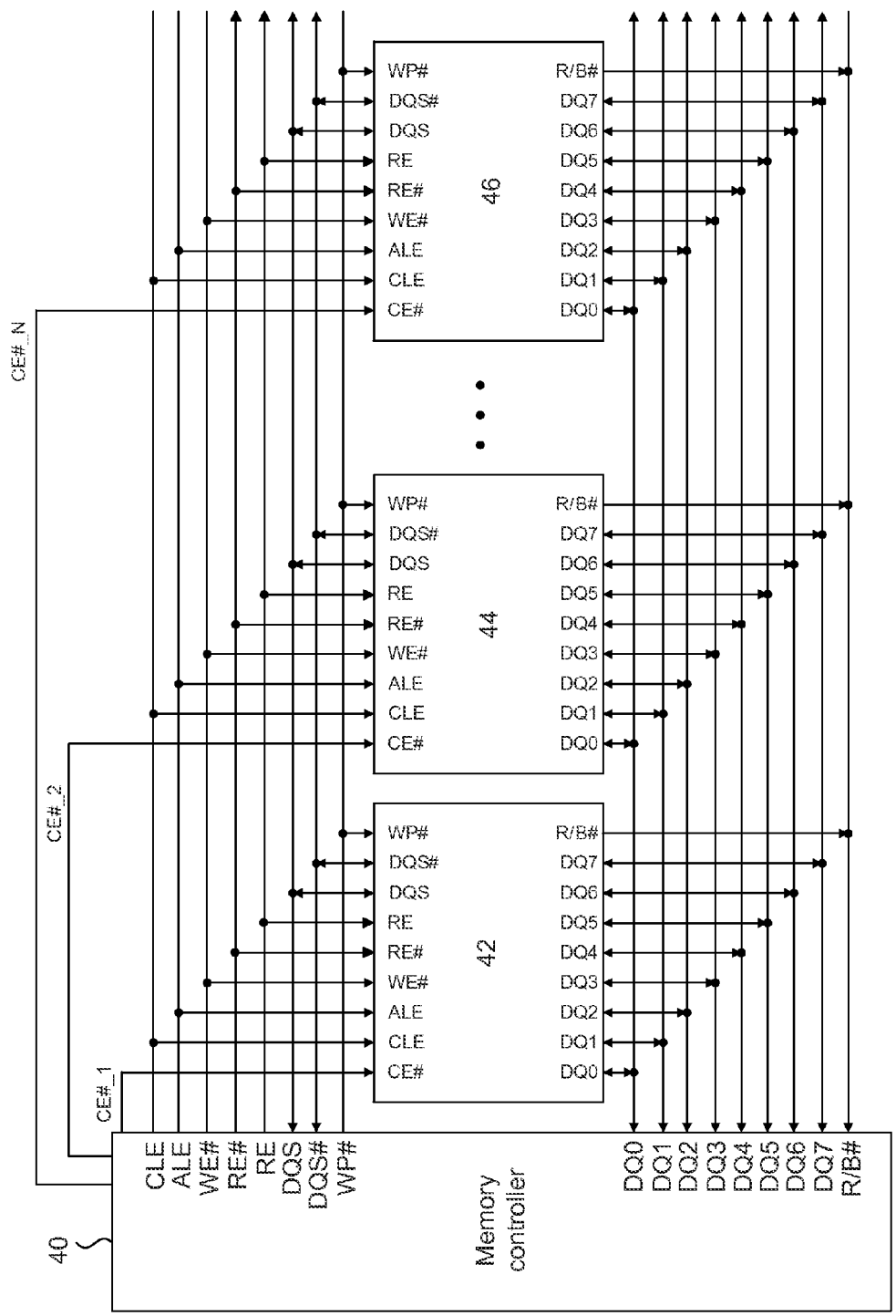
FIG. 3A is schematic showing a multi-drop memory system.

FIG. 3A illustrates an example nonvolatile memory system using ONFi NAND flash devices. The memory system includes an ONFi configured memory controller 40 and several ONFi flash devices 42, 44 and 46. All input and output signals except chip select (CE#) signal in each flash memory device are connected to common bus or channel. Thus, the ONFi flash devices 42, 44 and 46 are connected in parallel with the memory controller 40, and is also referred to as a multi-drop configuration. Each ONFi NAND flash memory device can be selected by enabling CE# signal. For example, the first ONFi flash device 42 can be selected and accessed by asserting CE#_1 (CE#_1=Low). The rest of the ONFi flash devices are unselected by keeping CE#_2 and CE#_N High, such and they ignore any input like commands or addresses from the memory controller 40. Also the output signals of the unselected ONFi flash devices are set to a high impedance (i.e. Hi-Z) state.

Each of the ONFi flash devices 42, 44 and 46 use the same electrical signals for coordinating commands and data transfer between the ONFi flash device and a host controller device (not shown) through a channel control module. In the presently shown example, the ports for one channel control module are shown in FIG. 3A. Those signals include data lines and control signals, such as ALE (Address Latch Enable), CLE (Command Latch Enable), WE# (Write Enable), RE#(Read Enable), and others as previously shown in Table 1. This type of interface protocol is known in the art as "ONFi NAND interface". Even though the "NAND interface protocol" has not, to date, been formally standardized by a standardization body, the manufacturers of NAND flash devices all follow the similar protocol for supporting the basic subset of NAND flash functionality. This is done so that customers using NAND flash memory devices within their electronic products could use NAND flash memory devices from any manufacturer without having to tailor their hardware or software for operating with the devices of a specific vendor. It is noted that some NAND flash memory vendors can provide extra functionality beyond this basic subset of functionality, while ensuring that the basic functionality is provided in order to provide compatibility with the protocol used by the other vendors.

Figure 3B:
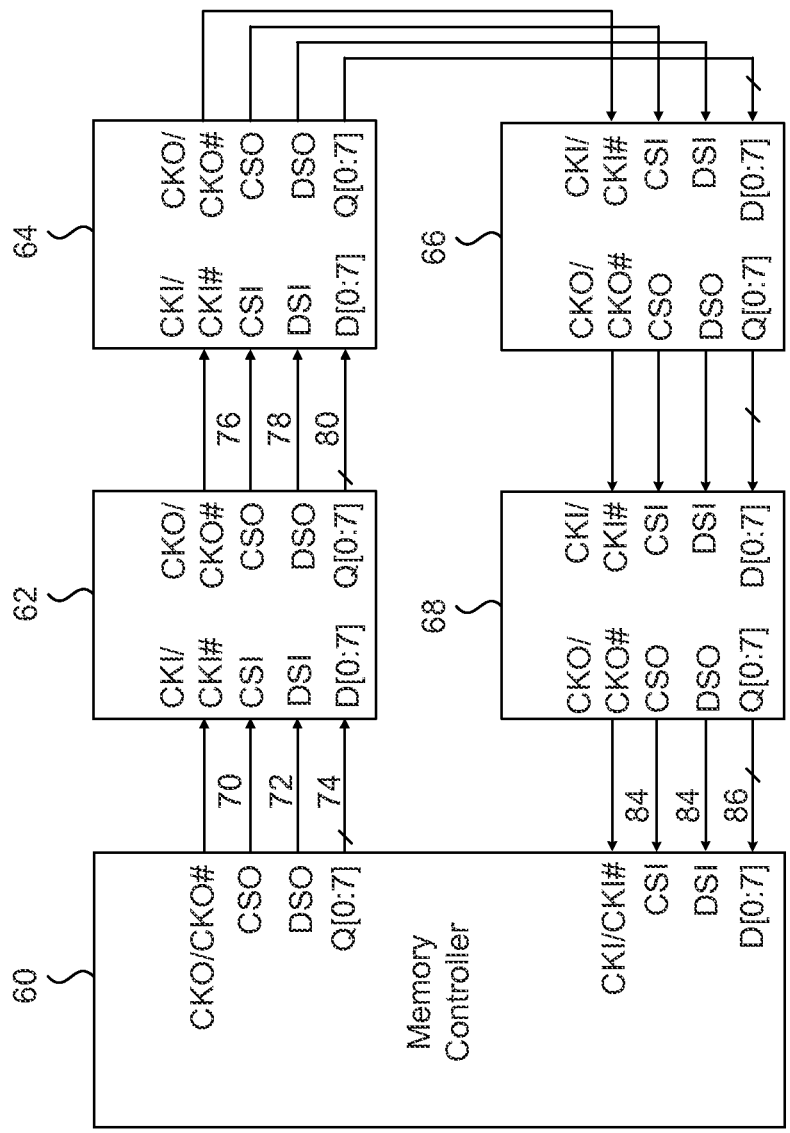
FIG. 3B is schematic showing a serially connected memory system.

FIG. 3B illustrates an example of a non-volatile memory system using HLNAND flash memory devices. The memory system includes an HLNAND™ configured memory controller 60 and several HLNAND compatible flash devices 62, 64, 66 and 68. Referring to FIG. 3B, the HLNAND memory devices 62, 64, 66 and 68 uses a highly multiplexed unidirectional point-to-point bus architecture to transfer information such as commands, addresses and data. Each interconnection of these commands, addresses and data between memory devices is referred to as a "Link". In one example, one single link consists of six signals, CSI (=Command Strobe Input), CSO (=Command Strobe Output), DSI (=Data Strobe Input), DSO (=Data Strobe Output), D[0:7] (=Data Input), and Q[0:7] (=Data Output), along with two differential clock input signals, CKI/CKI#, clock output signals, CKO/CKO# and optional common signals CE# (Chip Enable) and RST# (Reset).

Following is a brief discussion of the way some of these control signals are used in the memory system of FIG. 3B. CKI/CKI# are input clocks. A Command/Address Packet on the D[0:7] ports delineated by CSI is latched on the rising edges of CKI or the falling edges of CKI#. A Write Data Packet on D[0:7] delineated by DSI is latched on the rising edges of CKI or the falling edges of CKI#. A Read Data Packet on Q[0:7] delineated by DSO is referenced at the rising edges of CKO or the falling edges of CKO#. CKO/CKO# are output clocks which are delayed version of CKI/CKI#.

CSO, DSO and Q[0:7] signals are referenced to the rising edges of CKO or to the falling edges of CKO#. When the Command Strobe Input (=CSI) is HIGH, Command/Address Packets through D[0:7] are latched on the rising edges of CKI or falling edges of CKI#. Command Strobe Output (=CSO) is an echo signal of CSI. It bypasses (=or echoes) CSI transitions with one clock cycle latency (=tIOL) referenced to the rising edges of CKO or to the falling edges of CKO#. One clock cycle latency is one of exemplary embodiment in this disclosure, however it could be any number of clock cycles depending on the design variations.

When Data Strobe Input (=DSI) is HIGH while the HLNAND compatible memory device is in 'Read-Mode', it enables the read data output path and Q[0:7] buffer. If DSI is LOW, the Q[0:7] buffer holds the previous data accessed. If DSI is HIGH while the memory device is in 'Write-Mode', it enables the D[0:7] buffers and receives a Write Data Packet on the rising edges of CKI or falling edges of CKI#.

Data Strobe Output (=DSO) is an echo signal of DSI. It bypasses or echoes DSI transitions with one clock cycle latency (=tIOL) referenced to the rising edges of CKO or to the falling edges of CKO#. One clock cycle latency is one of exemplary embodiment in this disclosure, however it could be any number of clock cycles depending on the design variations.

The Data Input signal D[0:7] carries command, address and/or input data information, while the Data Output signal Q[0:7] (n=0, 1, 2, 3, 4, 5, 6 or 7) carries output data during a read operation or bypasses command, address or input data received on D[0:7].

The memory controller 60 drives differential clocks from its ports CKO/CKO#, and all of the HLNAND compatible memory devices 62, 64, 66 and 68 receive the differential clock buses through their own clock ports, CKI/CKI#, from the previous CKO/CKO# ports in a series flow-through manner. The memory controller 60 drives three different buses 70, 72 and 74 through its ports, CSO, DSO and Q[0:7], respectively. The first memory device 62 receives the three buses, 70, 72 and 74, through its ports, CSI, DSI and D[0:7], respectively. And the first memory device 62 re-drives three corresponding buses, 76, 78 and 80 through its output ports, CSO, DSO and Q[0:7], respectively, with one clock cycle of latency (=tIOL). This pattern of receiving signals and re-driving them to successive memory devices continues until the last memory device 68 re-drives the final buses, 82, 84 and 86 back to the memory controller 60 through the memory controller's input ports, CSI, DSI and D[0:7], respectively. In the present example, it is not necessary to re-drive the signal from the CSO port of memory device 68, therefore the CSI input port of memory controller 60 may be omitted, and final bus 84 is not required.

It should be clear to any person skilled in the art that the ONFi and HLNAND memory interface protocols differ sufficiently from each other, and any memory controller configured for the ONFi memory interface protocol will not work with HLNAND memory devices, and vice versa. The previously discussed ONFi and HLNAND memory systems are merely examples of two different types of memory interface protocols that are not compatible with each other. Any of the previously mentioned memory device types are highly unlikely to be compatible with each other, as each type requires a specific memory interface protocol that would not work with a different memory device type.

In view of the different types of available memory devices, manufacturers may design different data storage device devices based on different types of memory devices. For example, traditional NAND flash memory device based data storage devices are commonly available due to the availability and low cost of traditional NAND flash memory devices. By example, these can be ONFi type flash memory devices. Unfortunately, the multi-drop configuration of the ONFi type flash memory system as shown in FIG. 3A will have a finite number of memory devices which can be connected in parallel to one channel of the memory controller 40 without degrading the overall speed and performance of the system. This is due to the cumulative loading effects of each memory device connected to the bus. Therefore, while the cost of such a data storage device may be low, the maximum storage density will also be relatively low.

On the other hand, the HLNAND type of memory device does not suffer from the limitations of multi-drop configured memory systems. In the HLNAND memory system, such as the one shown in FIG. 3B by example, any number of memory devices can be connected in series with each other with one channel of the memory controller 60. Therefore the total storage density of a data storage device using HLNAND type of memory devices can be very large.

The problem faced by manufacturers is the need to purchase different memory controllers configured for a specific type of memory device, or a specific memory interface protocol, for producing different types of data storage devices. To mitigate cost risk, a memory controller configured to operate with two or more memory interface protocols is possible, provided separate ports are available for connection with the selected type of memory device. Unfortunately, providing separate sets of ports becomes impractical due to the number of ports that would be required on the memory controller package. Take for example the ONFi and HLNAND memory controller examples, which were discussed earlier. If an 8 channel ONFi interface requires a total of 136 ports only for ONFi NAND signals, and an 8 channel HLNAND memory controller interface requires a total of 192 ports, then a memory controller configured to operate in either interface protocol would require 328 ports. It should be appreciated by persons skilled in the art that a memory controller package size is dominated by the number of ports. Therefore, a package having 328 ports would likely be significantly larger in area than a package having 136 ports or 192 ports.

According to an embodiment of the disclosure, a memory controller configurable to operate in at least one of two different memory interface protocols using one set of ports per channel is provided. The ports of a channel are mapped to at least two different functional assignments, where each functional assignment corresponds to the signals specific to a memory interface protocol. Each port includes a pad for electrical connection to a signal conductor line to a memory device, and buffer circuitry for each of the at least two functional assignments. Different buffer circuitry of each port is selectively enabled based on the selected memory interface protocol to be used.

Figure 4:
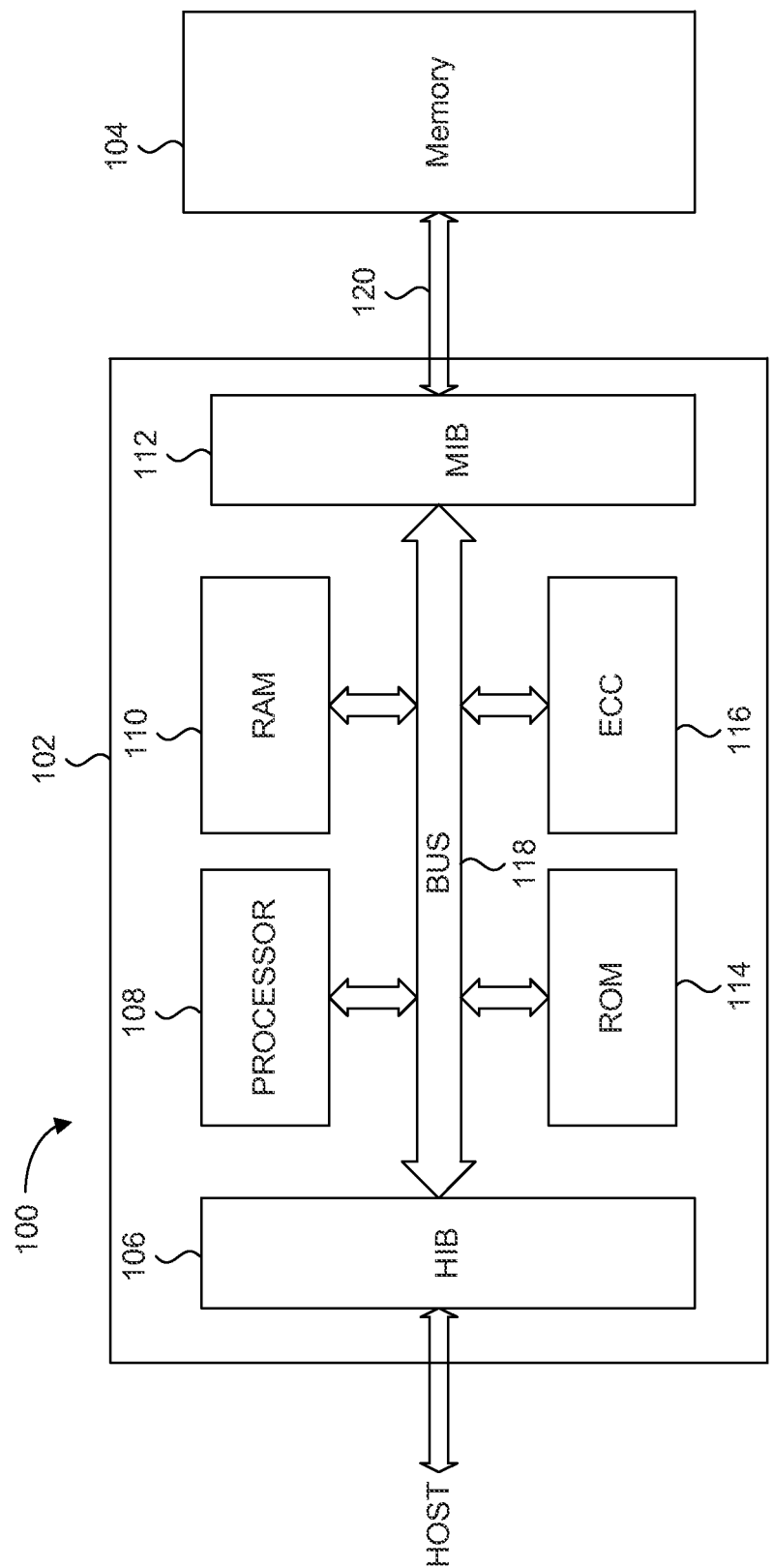
FIG. 4 is a block diagram of solid state storage device using a dual mode pinout memory controller, according an embodiment of the present disclosure.

A block diagram of a solid state storage device using a dual mode pinout memory controller according to an embodiment of the present disclosure is shown in FIG. 4. The solid state storage device 100 includes a dual mode pinout memory controller 102 and memory 104. In certain embodiments, the memory 104 includes non-volatile memory such as ONFi flash memory devices or HLNAND flash memory devices. In the present embodiment, any type of memory devices can be used as memory 104. In the present context, memory 104 includes memory devices.

The controller 102 controls overall operations of the solid state storage device 100, and controls exchange of data between the host and the memory 104. For example, the controller 102 controls the memory 104 to write data or to read data, in response to a request from the host (not shown). Also, the controller 102 controls internal operations, such as for example, performance control, merging and wear leveling, which are needed for the characteristics of nonvolatile memory, or for efficient management of the memory 104. The controller 102 drives firmware and/or software for controlling operations of the memory 104, which is referred to as a flash translation layer (FTL) (not shown). The controller 102 may control the memory 104 to control operation of a number of memories from among the multiple nonvolatile memories included in the memory device 104, based on a request from the host. The memory 104 provides storage medium for storing data. If memory 104 is at least a non-volatile memory device, the data is stored in a nonvolatile manner. For example, the nonvolatile memory device may store an operating system (OS), various programs, and various multimedia data.

In its primary mode of operation, the dual mode pinout memory controller 102 controls exchange of data between the host and the memory 104. The dual mode pinout memory controller 102 includes a host interface block (HIB) 106, a central processor unit 108, a random access memory (RAM) 110, a memory interface block (MIB) 112, a read only memory (ROM) 114, and an error correction code (ECC) engine 116 which are interconnected through a bus 118. The controller 102 may operate the FTL embodied as software or firmware. The RAM 110 is shown integrated within the controller 102, but it can be located outside of the controller 102 in alternate embodiments.

The host interface block 106 receives data, address information, external commands, and other signals from the host via host interface ports. These are generally referred to as information. The address information, commands and any other non-data related signals can be simply referred to as control information. Also, the host interface block 106 sends data, and status information to the host via the same or different host interface ports. These interface ports can include pins or other physical connectors. The received external commands from the host are used to control the memory controller 102. Data and other information provided by the host to the solid state storage device 100 are input into functional blocks of the solid state storage device 100, for example the buffer RAM 110, through the host interface block 106 as an inlet for data. Also, data and other information provided from the solid state storage device 100 to the host are provided through the host interface block 106 as an outlet for data.

The central processor 108 reads a program code from the ROM 114 or the memory 104, and controls all functional blocks included in the controller 102 according to the program code that is read. The program code specifies operations of the central processor 108. The central processor 108 controls access to the memory 104 on a basis of the program code read. In one mode of operation, the program code stored in the memory 104 is read from the memory 104 and written to the RAM 110 at a time when the solid state storage device 100 is booted up.

The RAM 110 may be used as an operating memory of the processor 108, and may be embodied as dynamic RAM (DRAM), static RAM (SRAM), or the like. Also, the RAM 110 may act as buffer memory for temporarily storing data received from the host. The processor 108 performs overall control operations to write data to, or read data from, the memory 104. Also, the processor 108 may control or otherwise perform operations of the FTL based on requests from the host.

The ECC block 116 generates an ECC (Error Correction Code) pertaining to data to be written to the memory 104. Data are stored together with the ECC pertaining thereto. Furthermore the ECC block 116 detects and corrects bit errors in data read from the memory 104 on a basis of the ECC associated with the read data.

The ROM 114 stores code data for interfacing with the host. In the ROM 114, firmware required for controlling the memory 104 is stored. Incidentally, only minimum firmware required for booting may be stored in the ROM 114 and the other firmware may be stored in the memory 104. Because the ROM is fixed read only memory, storing other firmware in the memory 102 facilitates updating of the firmware. The central processor 108, RAM 110, ROM 114, ECC engine 116 and any other circuits required for processing information received from the host or the MIB 112 can be referred to as core circuits.

The memory interface block 112 reads a sequence code from the ROM 114 or the memory 104. The sequence code specifies various operations performed by the memory interface block 112. The memory interface block 112 performs the various operations on a basis of the sequence code read. The sequence code is composed of a plurality of code sets. The code set comprises a plurality of codes. Each of the code sets specifies the operations corresponding thereto. In the operations performed on a basis of the sequence code, between the memory interface block 112 and the memory 104, data, address information, status information, internal commands and so on are transferred through an internal memory bus 120. The internal memory bus 120 includes signal conductor lines for electrically connecting ports of the controller 102 to corresponding ports of the memory 104. The internal memory bus 120 can carry signals corresponding to multiple channels. The internal command is for the controller 102 to control the memory 104, and the memory device 104 works according to the internal command. Incidentally, before the operations are performed, the sequence code stored in the memory 104 is read from the memory 104 and is written to the RAM 110.

The FTL includes a mapping table (not shown) for performing data mapping operations. In general, the mapping table is stored in the RAM 110. In the mapping table, multiple logical page numbers (LPNs) are recorded to be respectively mapped to the memory 104. In the example where memory 104 is implemented as one or more NAND flash memory devices, data is written or read in units of a page. The LPNs may therefore be used as mapping units.

Also, the FTL may control the memory 104 based on whether a request from the host is a write command or a read command, and may manage the mapping table to be updated whenever the write command or the read command provided by the host is performed on the memory 104. For example, when a request from the host is a write command, the FTL controls data to be written to one of the memory devices of memory 104 corresponding to an LPN, and writes the LPN and the corresponding memory device in the mapping table.

When a request from the host is a read command, the FTL controls data to be read from one of the nonvolatile memories corresponding to an LPN, based on the mapping table.

As mentioned above, the memory 104 may include multiple nonvolatile memories, each of which may be implemented as a NAND flash memory device that executes operations with a specific memory interface protocol. According to the present embodiments, different types of memory devices having different memory interface protocols can be used with the same dual pinout memory controller 102. In the present embodiment, the memory interface block 112 includes one set of ports for each channel, where at least one port is dynamically configurable to function in one of two modes, and each mode corresponds to a different memory interface protocol. Therefore two different types of memory 104 can be connected to a channel of the memory interface block 112 without the need for any additional ports, because both types of memory 104 can be connected to the same ports of the channel via the signal lines of bus 120.

The ports can be configured to function in either of the two memory interface protocols by connecting a dedicated or existing port to either the positive or ground power supplies (VDD or VSS). While such a technique is effective for selecting between one of two memory interface protocols, the memory interface block 112 can be configurable to have any number of memory interface protocols. In such an embodiment, a register can be electrically programmed by blowing fuses or antifuses, or laser programmed, to provide a multi-bit code to select one of n modes of operation. Alternately, more than two ports can be connected to VDD or VSS in order to provide a multi-bit code to select one of n modes of operation. In all these embodiments, the required buffer circuitry for each mode of operation is selectively couplable to a respective port of memory interface block 112. The native memory controller signals received from the bus 118 are converted by the selected buffer circuitry into a format compatible with the selected memory interface protocol. Similarly, signals received from the bus 120 are converted by the selected buffer circuitry into the native memory controller signals.

Prior to discussing the details of the port buffer circuitry, the organization of the memory interface block 112 is first described with reference to FIGS. 5 and 8.

Figure 5:
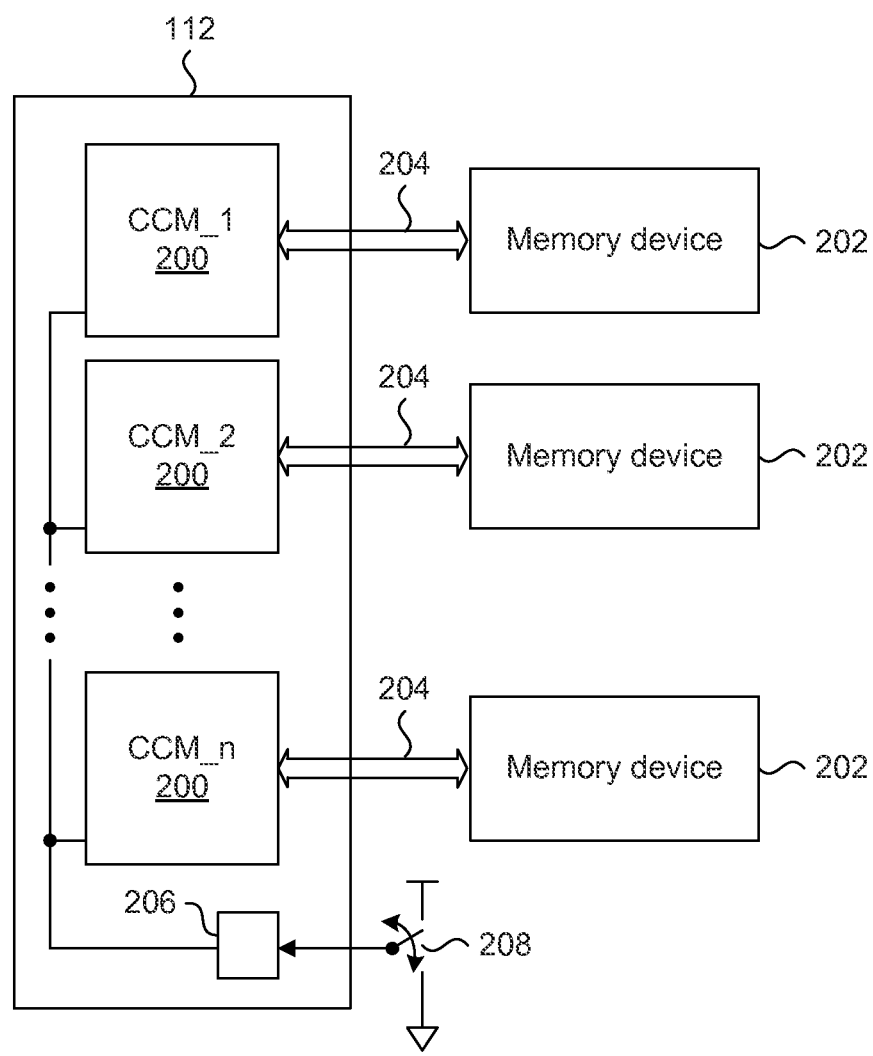
FIG. 5 is a block diagram of a memory interface block of the dual pinout memory controller shown in FIG. 4, according to an embodiment of the present disclosure.

FIG. 5 shows a block diagram of a memory interface block 112 of the dual pinout memory controller 102 shown in FIG. 4, where the memory interface block 112 is connected to at least one memory device. The memory interface block 112 includes up to n channel control modules (CCM) 200, where n can be any integer value greater than zero. Each channel control module 200 is associated with a channel, and is therefore connected to at least one memory device 202 via channel buses 204. It is noted that the collection of channel busses 204 forms bus 120 shown in FIG. 4. Similarly, all the memory devices 202 are included within memory 104 shown in FIG. 4. The memory interface block 112 further includes a mode selector 206 including a port which can be biased to VDD or VSS. In FIG. 5, the option for connecting the mode selector port to VDD or VSS is shown by the inclusion of switch means 208. The mode selector 206 and its corresponding port can alternately be placed outside of memory interface block 112, and within dual mode pinout memory controller 102. In response to the connection of the port, the mode selector 206 provides a mode selection signal to each of the channel control modules.

According to the present embodiment, each channel control module 200 includes one set of ports, where at least one of the ports includes buffer circuitry that is configurable to function in at least one of two different modes, in response to the mode selection signal. By example, if the memory devices 202 are ONFi type flash memory devices, then the interconnection configuration of the memory devices 202 and its channel control module would appear as shown in FIG. 3A. On the other hand, if the memory devices 202 are HLNAND type flash memory devices, then the interconnection configuration of the memory devices 202 and its channel control module would appear as shown in FIG. 3B. According to the present embodiment, both the ONFi type flash memory devices and the HLNAND type flash memory devices can be connected to the channel control modules 200.

Figure 6:
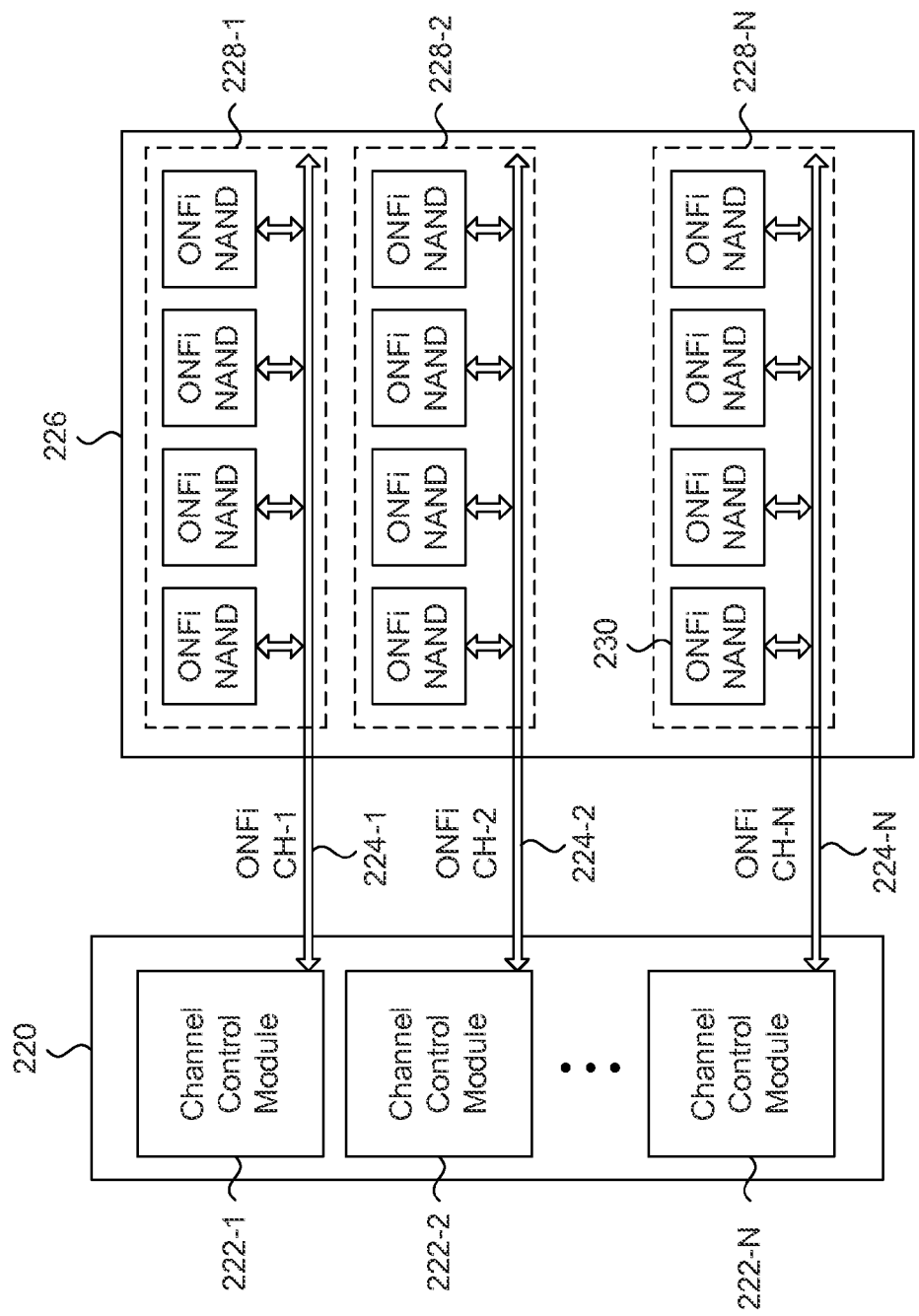
FIG. 6 is a block diagram of a multi-drop bus architecture memory system using a dual pinout memory controller, according to an embodiment of the present disclosure.

FIG. 6 is a block diagram of a multi-drop bus architecture memory system having a dual pinout memory controller, according to one embodiment. More specifically, FIG. 6 shows an example configuration of the solid state storage device 100 of FIG. 4, configured in a multi-drop architecture. The memory interface block 220 of the dual pinout memory controller includes a plurality of channel control modules 222-1 to 222-N each for controlling a respective channel 224-1 to 224-N, also referred to as ONFi CH-1 to ONFi CH—N. It is noted that "N" is an integer number denoting the last unit of the element the base number refers to. The channels are provided to a non-volatile memory 226. In electrical communication with each channel is a memory device 228-1, 228-2 and 228-N, where each memory device can be a single packaged memory device. Each of the memory devices includes a number of ONFi nonvolatile NAND flash memory chips 230, of which only one is annotated in FIG. 6. Each ONFi NAND flash memory chip 230 is in bi-directional communication with its associated channel for receiving information from a channel control module, or for providing information to a channel control module. The memory chips 230 of a memory device are connected in parallel with a channel.

Each of the channel control modules 222-1 to 222-N of the memory interface block 220 is dedicated to a respective channel ONFi CH-1 to ONFi CH—N of the nonvolatile memory 226, for the purpose of controlling the nonvolatile memory 226, and in particular, the individual memory devices 228-1 to 228-N. For example, the flash translation layer (FTL) which is generally firmware and/or software, controls the operations of the channel control modules 222-1 to 222-N corresponding to the channels ONFi CH-1 to ONFi CH—N in order to control the nonvolatile memory 226 to activate or deactivate various ONFi NAND flash memory chips 230 connected to channels ONFi CH-1 to ONFi CH—N, based on requests from a host. Activation of a memory chip can include initiating various types of memory operations in the selected memory chip.

In order to increase storage capacity and to improve the signal integrity on large numbers of non-volatile flash memory devices implemented in the solid state storage systems such as SATA or PCIe based solid state drives (SSDs) for HDD replacement, an alternate type of flash memory can be used. One example alternate type of flash memory is the previously described HLNAND flash memory. HLNAND flash memory is an advanced and high performance synchronous non-volatile flash memory device using point-to-point serial connection technology, typically arranged in a ring topology with a memory controller, as shown in FIG. 3B for example.

Figure 7:
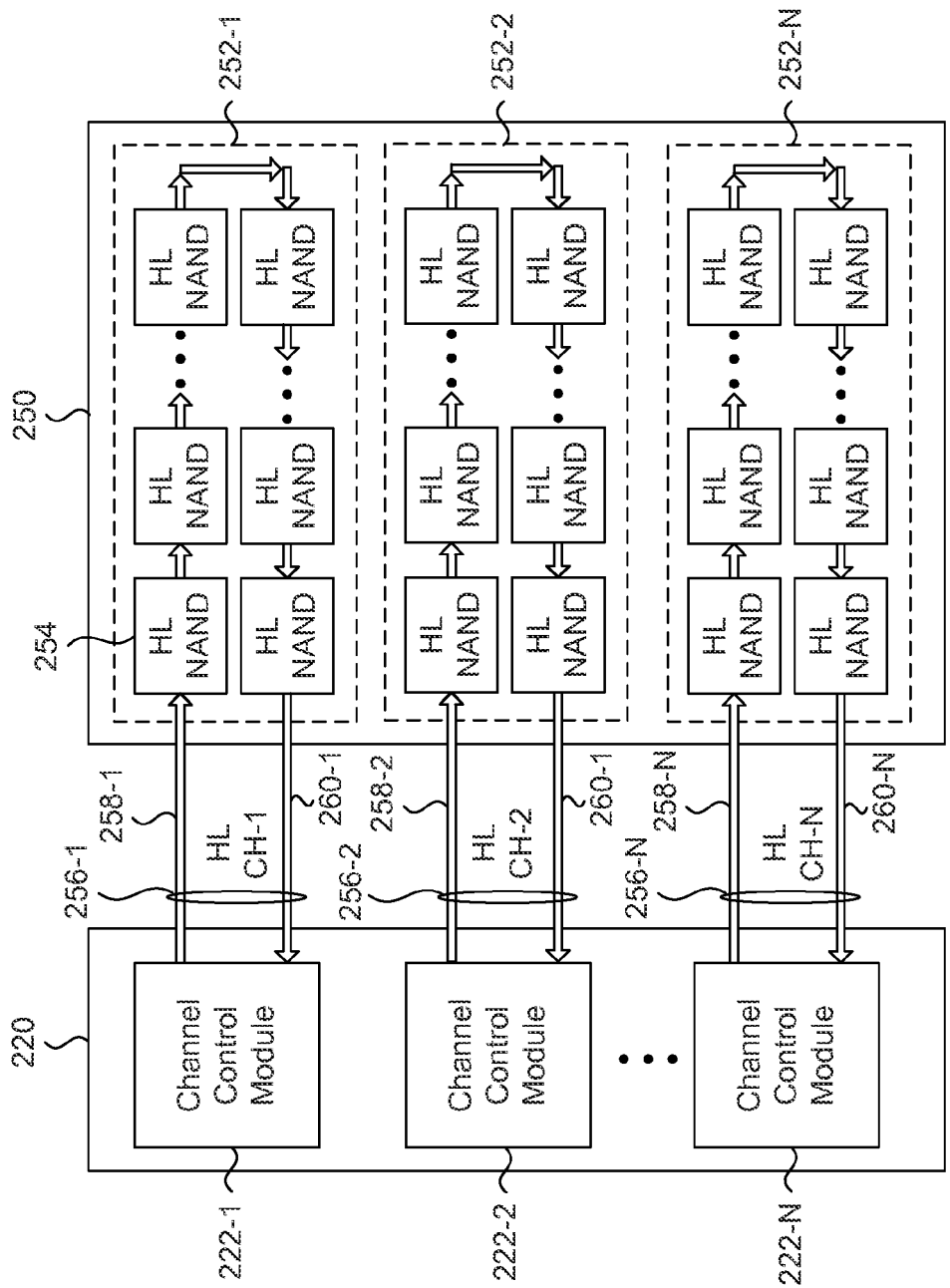
FIG. 7 is a block diagram of a serial point-to-point architecture memory system using a dual pinout memory controller, according to an embodiment of the present disclosure.

FIG. 7 is a block diagram of a serial point-to-point architecture memory system having the same dual pinout memory controller as the memory system of FIG. 6, according to the present embodiment. More specifically, FIG. 7 shows an example configuration of the solid state storage device 100 of FIG. 4, configured in a serial point-to-point architecture using HLNAND flash memory. The memory interface block 220 has the same channel control modules 222-1 to 222-N. The difference in the embodiment of FIG. 7 over the embodiment of FIG. 6 is that non-volatile memory 250 consists of HLNAND flash memory devices. As shown in FIG. 7, non-volatile memory 250 includes HLNAND flash memory devices 252-1 to 252-N, each of which can include a packaged device consisting of a plurality of HLNAND memory chips 254, of which only one is annotated. All the HLNAND memory chips 254 of a memory device, such as memory device 252-1 for example, are serially connected to each other via unidirectional, point-to-point connections. These point-to-point connections are formed in one example by having output pins of a device connected to input pins of the next device, and can take the form of a unidirectional bus. Accordingly, this serial interconnection can also be referred to as a daisy-chain cascade connection, or a ring topology configuration with a host, such as channel control module 222-1.

Accordingly, another difference over the embodiment of FIG. 6 is that the channel control modules 222-1 to 222-N are each connected to respective HLNAND channels 256-1 to 256-N, also referred to as HL CH-1 to HL CH—N. Each of the HLNAND channels includes an input sub-channel 258-1 and an output sub-channel 260-1. With reference to channel control module 222-1 by example, the input sub-channel 258-1 is the set of connections for providing data and control information to the first HLNAND memory chip 254 of the serially connected memory chips of memory device 252-1, from output terminals of the channel control module 222-1. The output sub-channel 260-1 is the set of connections for providing data and control information from the last HLNAND memory chip 254 of the serially connected memory chips of memory device 252-1, to input terminals of the channel control module 222-1.

Therefore, the channel control modules 222-1 to 222-N in this system need only to interface with the first HLNAND memory chip and the last HLNAND memory chip of the memory device. As a result, there are no clock skew and data skew problems which are caused by physical distance differences among chips in a system using the multi-drop connection. Furthermore, due to the use of point-to-point connections between memory chips and the corresponding channel control module, no bus termination that is typically used in multi-drop bus architectures is required. As a result, lower power consumption compared to a flash memory system using a multi-drop bus architecture is realized.

As there is one channel control module associated with the memory chips of each memory device, the FTL may control the operations of the channel control modules 222-1 to 222-N in order to control the non-volatile memory 250 to activate or deactivate various HLNAND flash memory chips 254 corresponding to the channels HL CH-1 to HL CH—N, based on requests from a host device, such as host 14 of FIG. 1. Activation of a memory chip can include initiating various types of memory operations in the selected memory chip.

The previously shown embodiments of FIGS. 6 and 7 illustrate memory systems using the same dual pinout memory controller according to the present disclosure. The ONFi and HLNAND memory types used for non-volatile memory 226 and 250 are merely examples of two different types of memories the dual pinout memory controller of the present disclosure can be used with. Different embodiments of the dual pinout memory controller can be configured to interface with combinations of presently known memories and future memories which have differing input/output interfaces.

Figure 8:
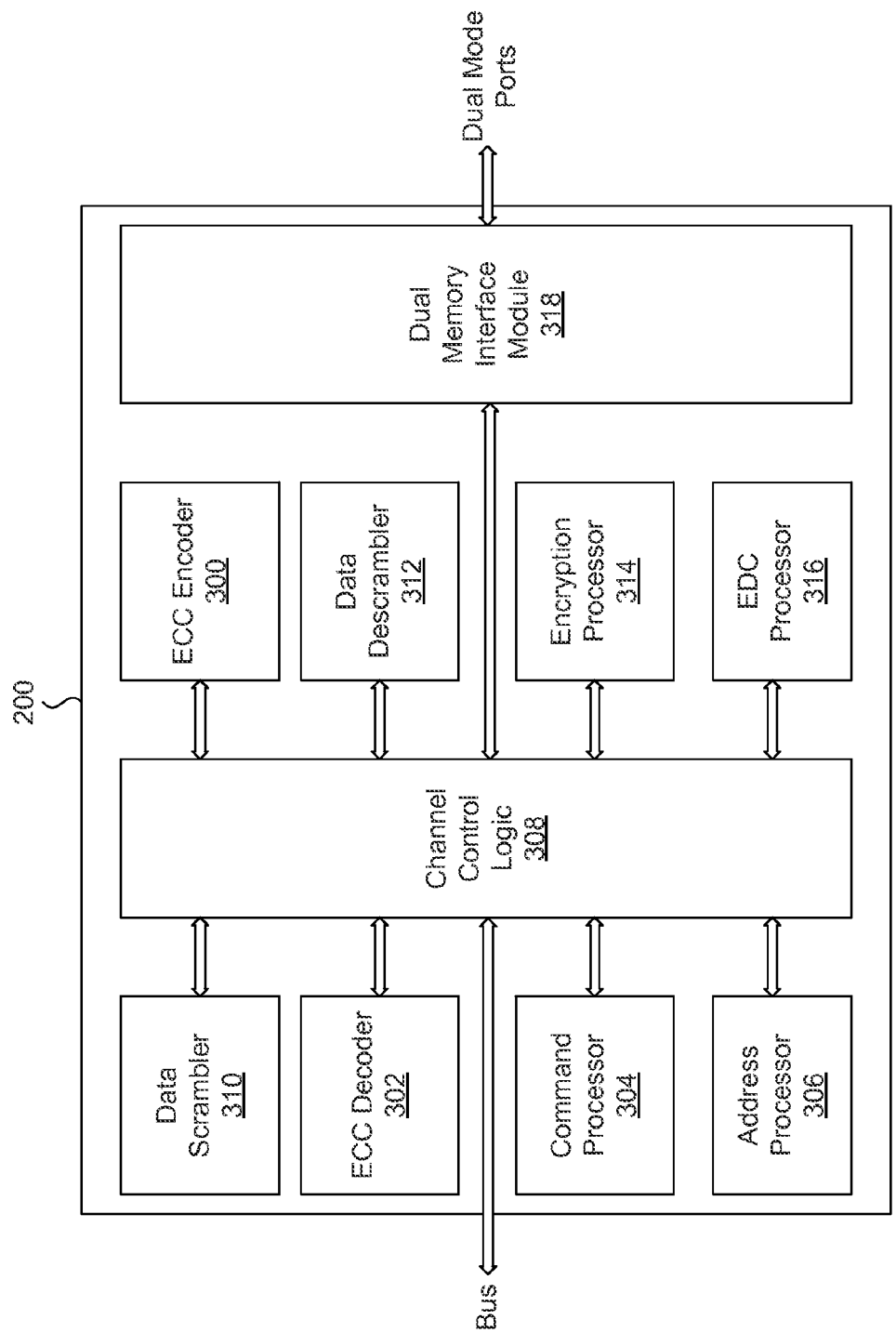
FIG. 8 is a block diagram of a channel control module of the memory interface block shown in FIGS. 7 and 8, according to an embodiment of the present disclosure.

FIG. 8 is a block diagram of one of the channel control modules 200 shown in FIG. 5. In this particular embodiment, the channel control module 200 is configurable to operate with one of two memory interface protocols. For the purposes of example illustration, the two memory interface protocols being used are the ONFi and HLNAND memory interface protocols.

In the presently shown embodiment, the channel control module 200 includes an ECC encoder 300, an ECC decoder 302, a command processor 304, an address processor 306, channel control logic 308, a data scrambler 310, a data descrambler 312, an encryption processor 314, an EDC processor 316, and a dual memory interface module 318. The dual memory interface module 318 includes a set of ports for electrical coupling to a memory device (not shown). The function of some of the above mentioned components is described with further reference to the block diagram of FIG. 4.

Generally, the data that is programmed into the memory device through the channel control module 200 has an error detection or error correction code appended to it and stored with the main data in the memory cell array of the memory device.

The channel control module 200 uses the ECC encoder 300 for this function. When such data is read from the memory device to the RAM 110 of FIG. 4, the ECC decoder 302 re-generates the ECC code from the data and compares it to the ECC code that was appended to the data when programmed into the memory device. If the data is identical to the data that was written, the ECC circuits indicate that there is no data error present. If some difference in the read data is detected, and the difference is small enough to be within the capability of the ECC to correct, the read data (typically contained in the RAM 110) is "corrected" or modified to restore it to the original value by the ECC correction engine 116, as controlled by the processor 108. If the data errors exceed the ECC correction capability, an "uncorrectable" read error occurs. Typically, an uncorrectable read error would result in an error status being returned to the host interface when read.

When the host sends a request to the processor 108 through the host interface block 106, in response to which the processor 108 reads the command from the host interface block 106 and, based on the command, sets up the data path in the channel control module 200 and stores the command in the channel control module's command register of command processor 304.

The processor 108 also translates the address from the host interface block 106 into an internal NAND address and stores it in the channel control module's address processor 306. If logical-to-physical address conversion is to be performed, the processor 108 can use a mapping table to create the correct physical address. The processor 108 can also perform one or more additional functions described below. The processor 108 then sets up a data transfer from the RAM 110 to the channel control module 200. It is noted that the memory interface block 112 can include multiple channel control modules, as shown in FIG. 5.

The channel control module 200 takes the value from the address processor 306 and formats it in accordance with the ONFi memory interface protocol format or HLNAND memory interface protocol format. The data stored in the RAM 110 is sent to the encryption processor 314 for encryption and is then sent through the data scrambler 310. The data scrambler 310 scrambles the data and outputs the scrambled data to the ECC encoder 300, which generates the ECC parity bits to be stored with the data. The data and ECC parity bits are then transferred, through the dual memory interface module 318 ports, with either an ONFi memory interface protocol format or an HLNAND memory interface protocol format, with the page program or write command to the memory devices for storage.

The channel control module 200 further includes an EDC processor 316 that includes an EDC encoder and an EDC decoder. The EDC processor 316 executes an Error Detection Coding algorithm for either the HLNAND or ONFi memory interface protocols. The channel control logic 308 is generally responsible for routing the processed information and data from one functional block to another, and the dual memory interface module 318 and the bus.

In summary, the previously described functional blocks of channel control module 200 execute data processing operations on the data to be written to the memory devices, and on the data read from the memory devices independent of the memory interface protocol being used. It is noted that the channel control logic 308 can also determine when to drive control signals through the dual memory interface module 318, such as control signals CLE, ALE, CSO and DSO for example, so that their assertions would be coordinated with specific memory operations and with the proper sequence. Accordingly, the channel control logic 308 is configured to execute algorithms specific to both HLNAND and ONFi.

The dual memory interface module 318 is responsible for capturing the data and other information received at the single set of ports, and converting the data and the received information from either of the two memory interface protocol formats into a native memory controller format. Conversely, the dual memory interface module 318 is responsible for providing commands, address and write data in either of the two memory interface protocol formats. As only a single set of ports are available, at least one port is assigned two different functions. It is possible that between two different memory interface protocols, only one signal differs in function. On the other hand, it is possible that every signal between two different memory interface protocols differs in function.

Figure 9:
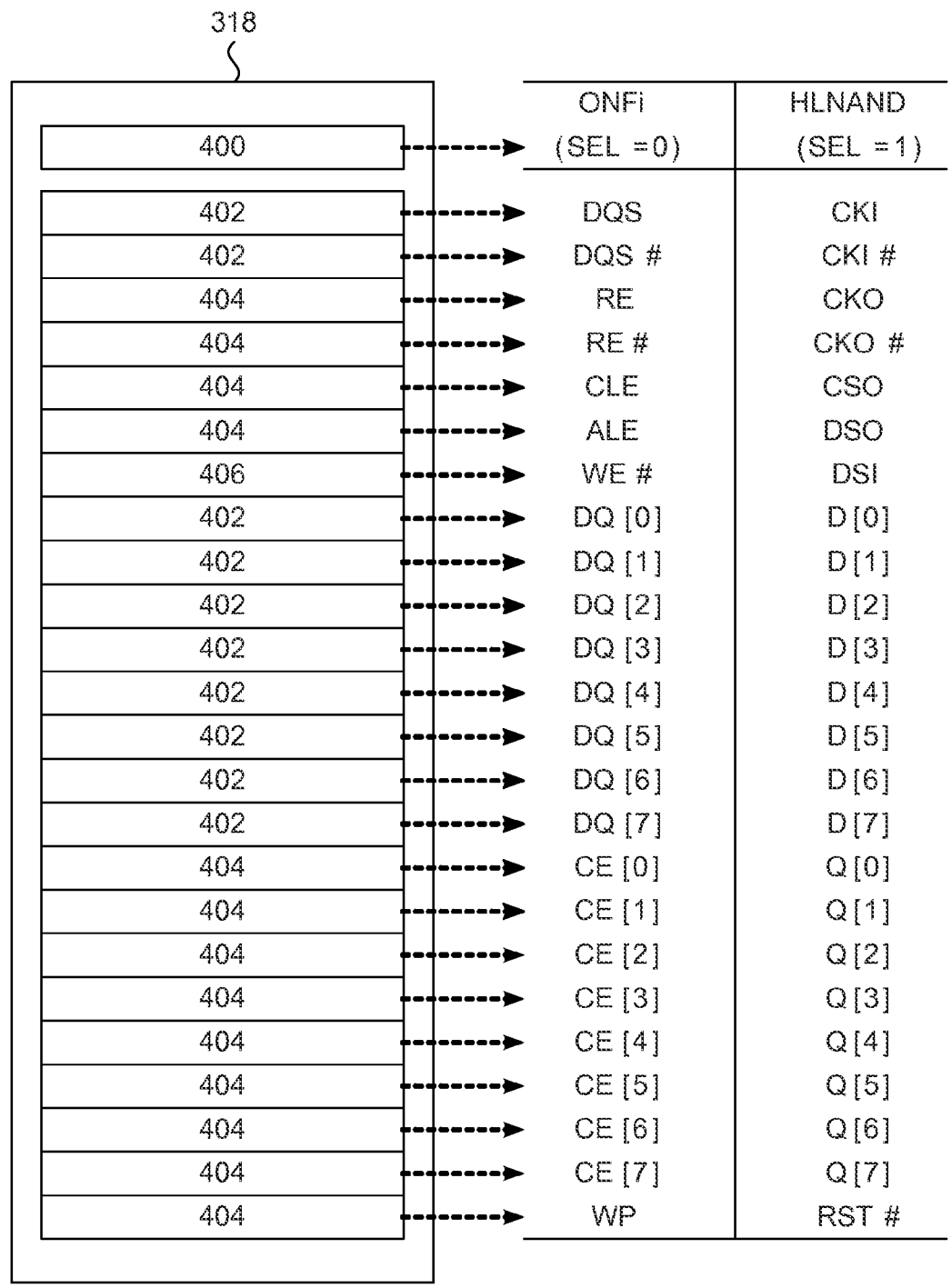
FIG. 9 is an illustration of dual pinout mappings of signals to ports of the dual pinout channel control module, according to an embodiment of the present disclosure.

FIG. 9 is a block diagram of the dual memory interface module 318 of FIG. 8, with multiple functional assignments for each port. According to the present embodiment, specific categories of signals in both memory interface protocols are mapped to the same port, wherever possible. Categories of signals include output signals, input signals, and bidirectional signals. For each category of signal, similar types of signals in both memory interface protocols are mapped to the same port, wherever possible. Types of signals include control, status, data, and clock signals. Each category of signals has a corresponding type of buffer circuit connected to a pad. In the embodiment of FIG. 9, the dual memory interface module 318 has port buffer circuits configured for two different memory interface protocols, such as the ONFi and HLNAND memory interface protocols.

The dual memory interface module 318 embodiment of FIG. 9 includes a port buffer circuit for each pad, where a pad is a metallized area of the semiconductor substrate for electrical connection to one end of a bond wire. The other end of the bond wire is connected to a physical pin of the package which encapsulates the semiconductor substrate. The dual memory interface module 318 embodiment includes multiple port buffer circuits indicated by reference numbers 400, 402, 404 and 406. The port buffer circuit 400 is an input buffer circuit, which in the present embodiment is a mode selector circuit. As shown in the table of FIG. 9, connection of the pad of port buffer circuit 400 to VDD (logic 1) or VSS (logic 0) selects which of the two memory interface protocols the other port buffer circuits 402, 404 and 406 are to be configured as. The port buffer circuits 402 and 406 are bi-directional port buffer circuits, meaning that they include driver and receiver circuits for outputting a signal and receiving a signal, respectively. The port buffer circuits 402 and 406 are configured differently from each other due to the types of signals they each receive. The port buffer circuits 404 are unidirectional port buffer circuits, and in particular, include only driver circuits for outputting a signal.

On the right side of dual memory interface module 318 is a table listing the signal assignments for each port buffer circuit. The left-most column lists the ONFi memory interface protocol signals for each port buffer circuit while the right-most column lists the HLNAND memory interface protocol signals for the same port buffer circuits. The present example illustrates one possible dual pinout mapping for the port buffer circuits. As shown in the table of FIG. 9, clock signals such as CKI and DQS from the two memory interface protocols are mapped to the same port buffer circuit 402, control signals such as CLE and CSO are mapped to the same port buffer circuit 404. It is noted that the ONFi memory interface protocol uses 8 bi-directional port buffer circuits for providing and receiving data signals DQ[0] to DQ[7], while the HLNAND memory interface protocol requires 8 ports for receiving input data D[0] to D[7] and 8 ports for driving output data Q[0] to Q[7]. Therefore, there is no direct mapping of the 16 data signals of the HLNAND memory interface protocol to the 8 data signals of the ONFi memory interface protocol. However, the ONFi memory interface protocol requires individual chip enable signals CE[0] to CE[7] for enabling respective ONFi memory devices of the channel, which are not required in the HLNAND memory interface protocol. Therefore, the chip enable ports for the ONFi memory interface protocol are configured to output data in the HLNAND memory interface protocol. The dual memory interface module 318 of FIG. 9 is intended to illustrate examples of how multiple signals can be assigned to the same port, and therefore may not show all the ports and signals for the ONFi and HLNAND memory interface protocols.

Embodiments of the port buffer circuits 400, 402, 404 and 406 are shown in the circuit schematics of FIGS. 10, 11, 12 and 13.

Figure 10:
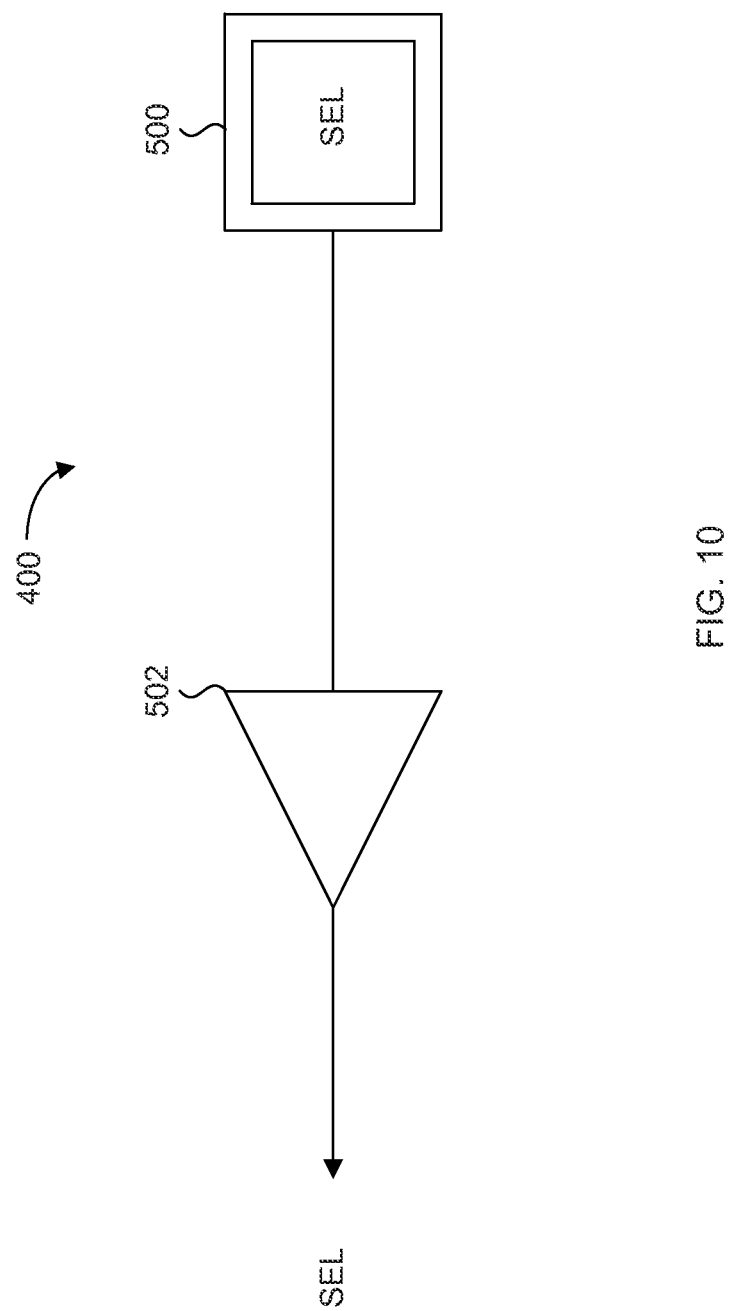
FIG. 10 is a circuit schematic of a mode selection interface circuit, according to an embodiment of the present disclosure.

FIG. 10 is a circuit schematic of the mode selection circuit 400 shown in FIG. 9, according to an embodiment of the present disclosure. As will be shown in further detail later, the other port buffer circuits are configured to operate in one of two different modes, depending on how the mode selection circuit 400 is set.

In the embodiment of FIG. 10, a pad 500 is a metallized area on the surface of a semiconductor chip or substrate, to which connections such as gold wire bonding can be made. In the present example, pad 500 is wire bonded to one of the power supply VDD or ground VSS. Input receiver circuitry 502, such as an input buffer circuit by example, detects the VDD or VSS connection of pad 500 to drive an internal a select signal SEL to either the internal high or low logic levels. In the present example, when SEL is a logic low level (0), the dual mode pinout memory controller 102 is set to operate with a first memory interface protocol, such as the ONFi memory interface protocol. When SEL is at a logic high level (1), the dual mode pinout memory controller 102 is set to operate with a second memory interface protocol, such as the HLNAND memory interface protocol. More specifically, each of the other port buffer circuits of the dual mode pinout memory controller is configured to receive or provide one of the two signals mapped to it.

As previously mentioned, two or more pads can be used for selecting between more than 2 different memory interface protocol modes, where each pad is connected to a respective input buffer circuit and the outputs can be decoded to enable specific logic circuitry of each port buffer circuit.

Figure 11:
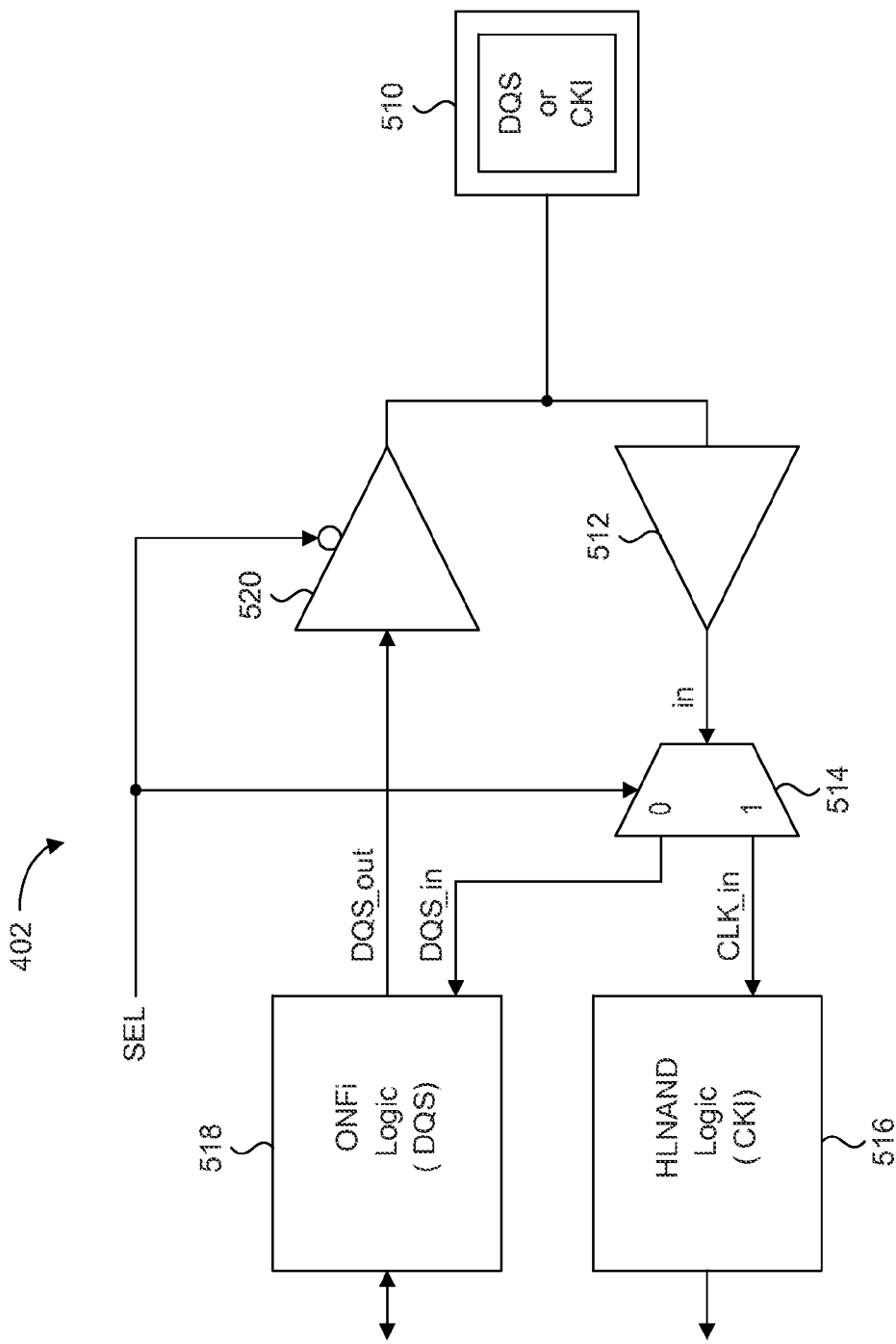
FIG. 11 is a circuit schematic of a dual mode bi-directional interface circuit, according to an embodiment of the present disclosure.

FIG. 11 is a circuit schematic of the bi-directional port buffer circuit 402 shown in FIG. 9, according to an embodiment of the present disclosure. A pad 510 can be electrically coupled to either the DQS pin of an ONFi memory device or the CKI pin of an HLNAND compliant memory device. The buffer circuitry includes a receive path and an output path. The receive path includes a receiver 512, such as an input buffer, a selector such as demultiplexor 514, and a first logic block 516 configured for receiving a signal from one memory interface protocol, such as the HLNAND memory interface protocol. The first logic block 516 is specifically configured to receive the CKI signal from pad 510 via demultiplexor 514, and may be configured to process the signal according to the requirements of the HLNAND memory interface protocol, and provides any required signals to specific circuit blocks of the channel control module 200. In particular, the HLNAND logic block 516 provides a buffered clock signal to the channel control module, and may include a delay locked loop (DLL) or a phase locked loop (PLL). The signal received by demultiplexor 514 is referred to as "in", which can correspond to the received DQS or CKI signals at pad 510. The demultiplexor 514 is controlled by selection signal SEL to pass signal "in" to one of two outputs labeled "0" and "1". In the present example, "in" is passed to the "1" output when SEL is at a logic level corresponding to selecting the HLNAND memory interface protocol mode. Conversely, "in" is passed to the "0" output when SEL is at a logic level corresponding to the ONFi memory interface protocol mode.

In the example of FIG. 11, SEL is at the low logic level for the ONFi memory interface memory protocol mode, and at the high logic level for the HLNAND memory interface protocol mode. In the HLNAND memory interface protocol mode, demultiplexor 514 provides clock signal CLK_in to logic block 516, while in the ONFi memory interface protocol mode, demultiplexor 514 provides data clock signal DQS_in to a second logic block 518.

The output path includes the second logic block 518, which controls both the output data clock signal DQS_out and the received input data clock signal DQS_in. In particular, second logic block 518 receives DQS_in from the dual memory interface module 318 and processes the signal to provide input data synchronization, in accordance with the requirements of the ONFi memory interface protocol, and provides any required signals to specific circuit blocks of the channel control module 200. Similarly, the second logic block 518 receives signals from the other circuits of the channel control module 200, such as the dual memory interface module 318, to generate the output data clock signal DQS_out for output data synchronization. The DQS_out signal is driven by output driver 520, to pad 510. It is noted that output driver 520 is enabled or disabled by selection signal SEL. As previously discussed for demultiplexor 514, SEL at a low logic level corresponds to the ONFi memory interface protocol mode. Therefore in this mode of operation, output driver 520 is enabled, or turned on for amplifying the DQS_out signal and driving pad 510. In the other mode of operation, namely when SEL is at a high logic level corresponding to the HLNAND memory interface protocol mode, output driver 520 is disabled, or turned off, leaving receiver 512 turned on to provide the received CKI signal from pad 510 to logic block 516 via demultiplexor 514. Then the buffered clock signal is provided to the dual memory interface module 318.

It is noted that when SEL is at the low logic level, both the output driver 520 and the receiver 512 are enabled so that any output DQS signal can be driven onto pad 510 while any received input DQS signal can be received by logic block 518 through receiver 512 and demultiplexor 514.

In the embodiment of FIG. 11, the port buffer circuit 402 is configured for either bi-directional DQS signals or a received CKI signal. However, a similar port buffer circuit can be employed for the other port buffer circuits labeled 402 in FIG. 9. As shown in the embodiment of FIG. 9, each ONFi signal is a bi-directional signal, while the HLNAND signal mapped to each bi-directional ONFi signal is an input signal. Accordingly, while the same circuit blocks of FIG. 11 would be used for the other port buffer circuits 402, the logic blocks 516 and 518 shown in FIG. 11 would be configured for processing those specific signals mapped to them.

Figure 12:
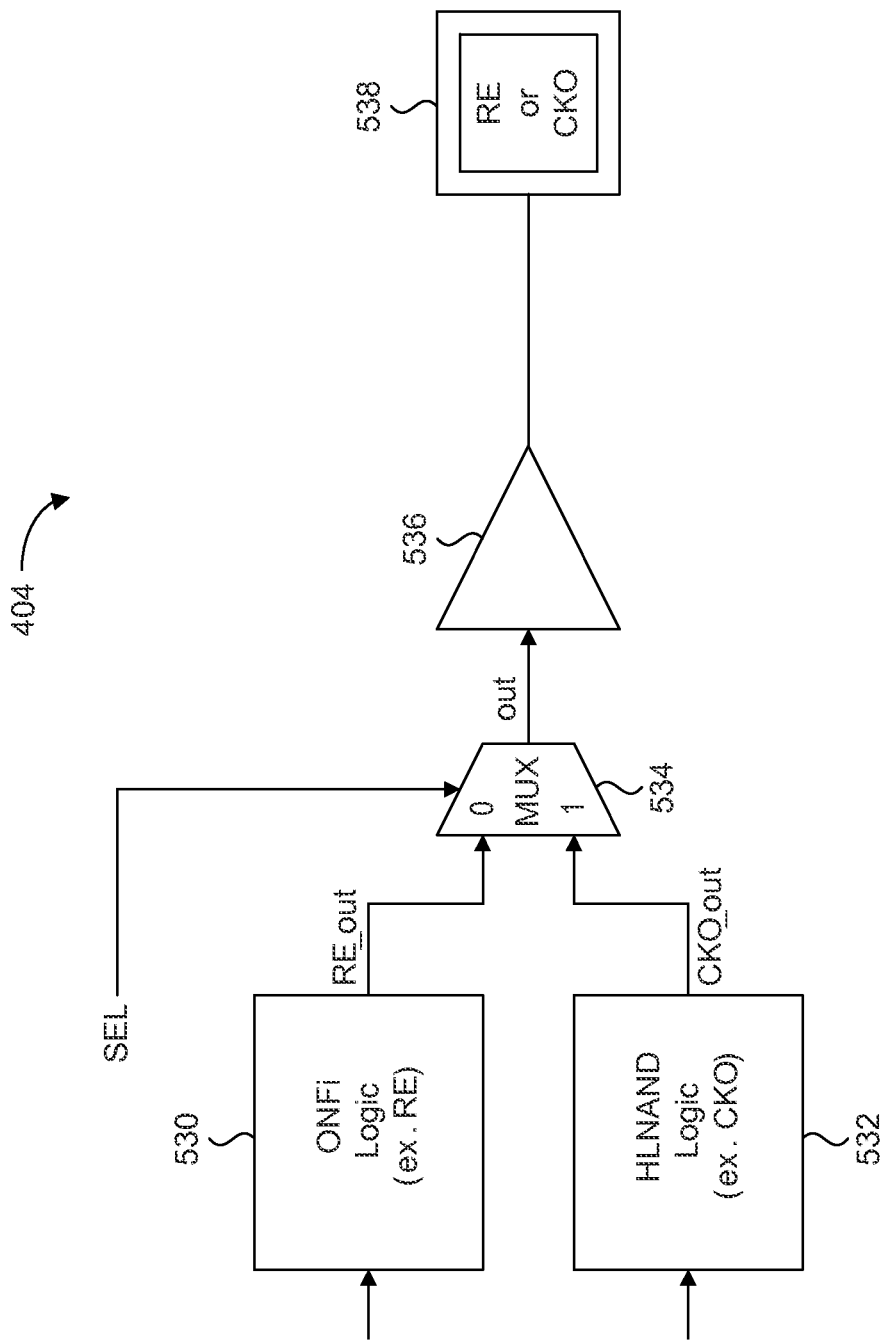
FIG. 12 is a circuit schematic of a dual mode output interface circuit, according to an embodiment of the present disclosure.

FIG. 12 is a circuit schematic of the output port buffer circuit 404 shown in FIG. 9, according to an embodiment of the present disclosure. The output port buffer circuit 404 includes a first logic block 530 configured to process a signal corresponding to a first memory interface protocol, a second logic block 532 configured to process a signal corresponding to a second memory interface protocol, a selector such as a multiplexor 534, an output driver 536, and a pad 538. In the presently shown example, the first logic block 530 is an ONFi logic block and the second logic block 532 is an HLNAND logic block. The ONFi logic block 530 receives information from the dual interface memory module 318 for providing a read enable signal RE_out in response to other circuit blocks of the channel control module 200, which is received by the "0" input of multiplexor 534. More specifically, the ONFi logic block 530 is configured to process received signals according to requirements of the protocol, to generate the RE_out signal. The HLNAND logic block 532 provides an output clock signal CKO_out in response to information received from the dual interface memory module 318, which is received by the "1" input of multiplexor 534. More specifically, the HLNAND logic block 532 is configured to process received signals according to requirements of the protocol, to generate the CKO_out signal.

The multiplexor 534 passes one of the RE_out and CKO_out as signal "out" in response to selection signal SEL. In the present example, SEL at the high logic level corresponds to the HLNAND memory interface protocol mode, thereby passing CKO_out to output driver 536. On the other hand, SEL at the low logic level corresponds to the ONFi memory interface protocol mode, thereby passing RE_out to output driver 536. The output driver 536 then amplifies and drives its received signal onto pad 538. It is noted that both signals RE and CKO are output signals for the ONFI and HLNAND memory interface protocols. Therefore the embodiment of FIG. 12 is an example showing how a port buffer circuit is configured to provide two different output signals.

Figure 13:
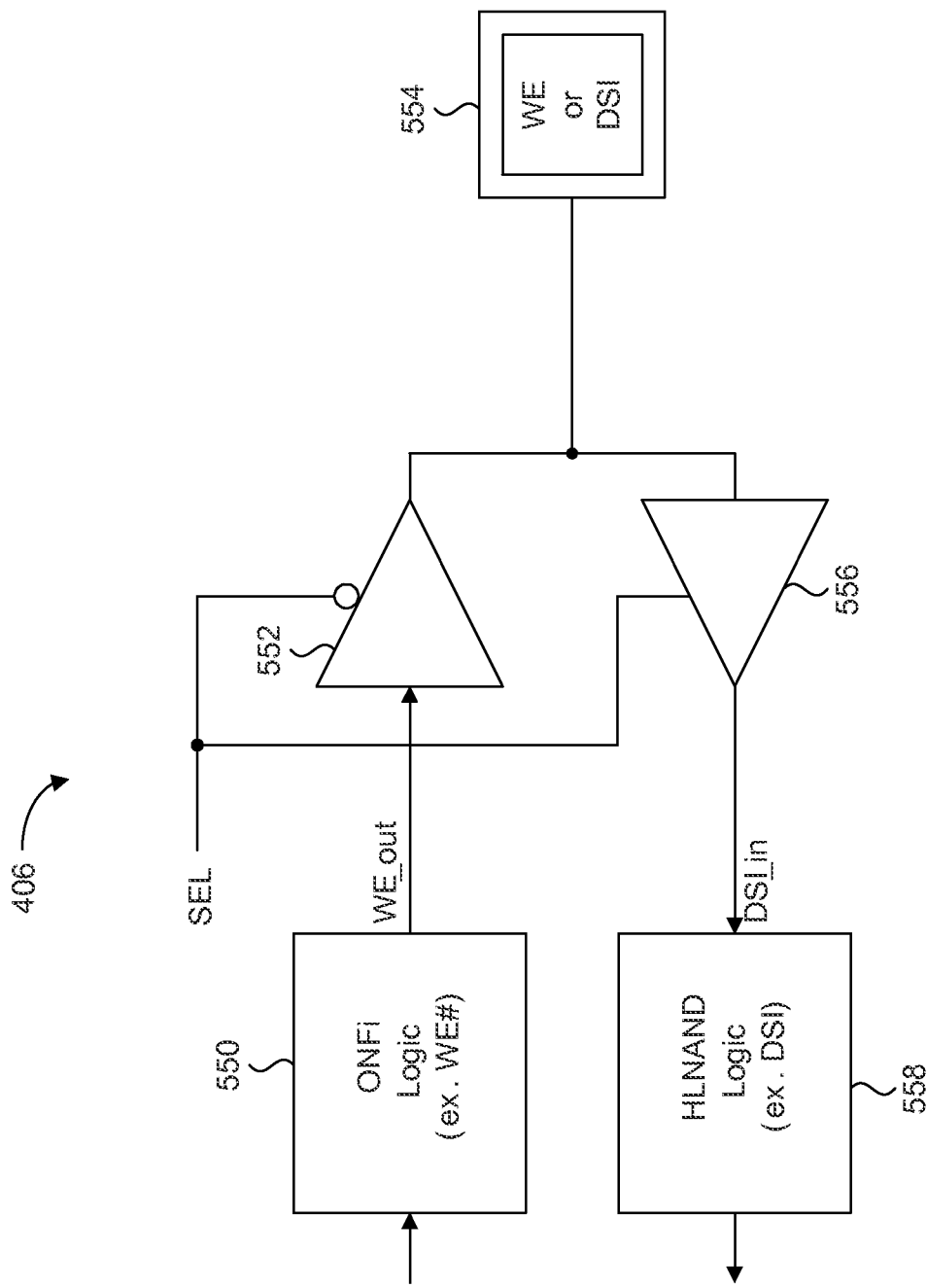
FIG. 13 is a circuit schematic of an alternate dual mode bi-directional interface circuit, according to an embodiment of the present disclosure; and, FIG. 14 is a circuit schematic of a dual mode input interface circuit, according to an embodiment of the present disclosure.

FIG. 13 is a circuit schematic of the alternate bi-directional port buffer circuit 406 shown in FIG. 9, according to an embodiment of the present disclosure. The bi-directional port buffer circuit 406 includes a receive path and an output path. The output path includes a first logic block 550, and an output driver 552 for amplifying and driving a signal onto pad 554. The receive path includes a receiver 556 for pre-conditioning the signal received at pad 554, and a second logic block 558. In the present example, the first logic block is an ONFi logic block that provides a write enable signal WE_out in response to other circuit blocks of the channel control module 200, and the second logic block is an HLNAND logic block that receives a data strobe input signal DSI_in that is provided to other circuit blocks of the channel control module 200. In particular, the logic block 550 is configured to process the signals received from the other circuit blocks of channel control module 200 according to requirements of the selected protocol, for generating the WE_out signal. Similarly, the logic block 558 is configured to process the DSI_in signal according to requirements of the selected protocol, and provide any required signals to specific circuit blocks of the channel control module 200.

The presently shown bi-directional port buffer circuit illustrates an example configuration where the pad provides an output signal in a first memory interface protocol mode, and receives an input signal in a second memory interface protocol mode. For example, when selection signal SEL is at the low logic level, output driver 552 is enabled while receiver 556 is disabled. Conversely, when SEL is at the high logic level, output driver 552 is disabled while receiver 556 is enabled. Accordingly, only one of the receive path and output path is active depending on the state of selection signal SEL.

It is noted that the embodiment of FIG. 13 shows output driver 520 and input buffer 512 being enabled or disabled by the selection signal SEL. While the embodiment of FIG. 11 shows just the output driver 520 being enabled or disabled by SEL, in an alternate embodiment, input buffer 512 can be enabled or disabled by SEL.

Figure 14:
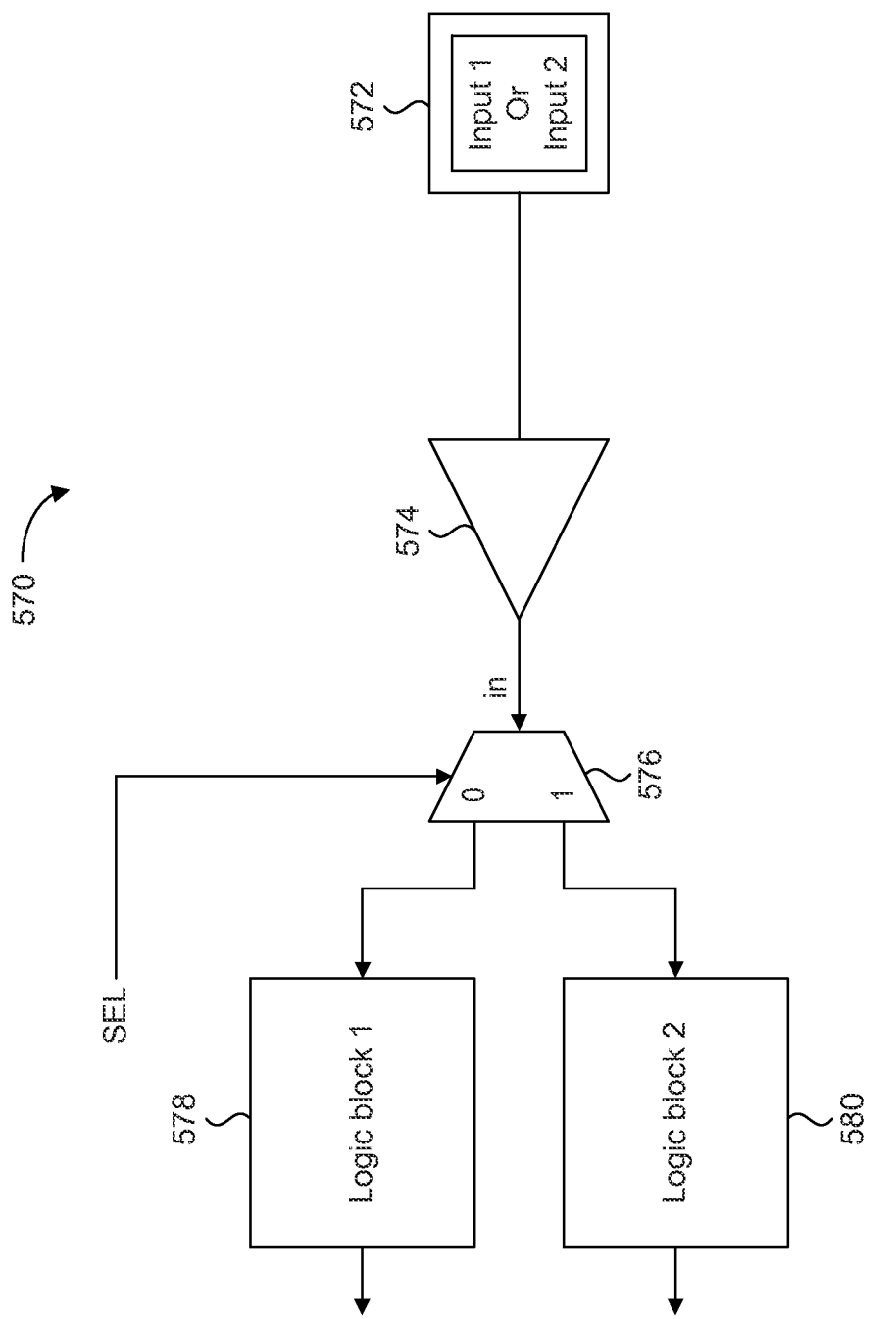

FIG. 14 is a circuit schematic of a dual mode input interface circuit, according to an embodiment of the present disclosure. This particular circuit embodiment can be used when input signals for two different memory interface protocols are mapped to the same port. As shown in FIG. 14, dual input port buffer circuit 570 includes a pad 572, a receiver 574 connected to pad 572, a selector such as a demultiplexor 576, a first logic block 578 configured to process a signal corresponding to a first memory interface protocol, and a second logic block 580 configured to process a signal corresponding to a second memory interface protocol. In the presently shown embodiment, no signals specific to any memory interface protocol are shown. Accordingly, the pad 572 can be electrically coupled to receive a first input or a second input, each corresponding to a different memory interface protocol. The receiver 574 buffers the signal received at pad 572, and passes the signal as "in" to an input of demultiplexor 576. Demultiplexor 576 passes "in" to either its "0" or "1" outputs in response to a state of the selection signal SEL. As previously mentioned, SEL is set to either the high or low logic levels to indicate the selected memory interface protocol being used. The logic blocks 578 and 580 are configured to process the signals according to requirements of the selected protocol, and provide any required signals to specific circuit blocks of the channel control module 200.

The previously shown embodiment of FIG. 9, and the port buffer circuit embodiments of FIGS. 10 to 14 show examples of one possible dual pinout mapping arrangement for the dual mode pinout memory controller embodiment. Other dual pinout mappings are possible, provided the port the signals are mapped to is configured to receive or provide the mapped signals. The previously shown port buffer circuit embodiments can be used for mapping combinations of input, output and bi-directional signals to a single port. In any case, the signals received at the port buffer circuits are received and processed by the channel control module 200, and passed to other circuit blocks of the memory controller 102 via bus 118. Ultimately, data is provided to the host via host interface 106. Similarly, any data and commands received at host interface 106 are processed by the circuit blocks of the memory controller via bus 118, and ultimately provided to a targeted channel control module of memory interface 112, which executes the necessary protocol adaptations for signaling to the memory devices.

The previously shown embodiments illustrate how signals of two memory interface protocols can be mapped to a single set of ports of a memory controller. In alternate embodiments, each port buffer circuit can be configured to receive more than 2 different types of signals. For example, the shown 2-1 multiplexors or 1-2 demultiplexors can be replaced with 3-1 multiplexors or 1-3 demultiplexors, and an additional logic block can be included for processing signals for outputting the third signal, or for processing the received third signal. Persons skilled in the art having understood the port buffer circuit embodiments of FIGS. 10 to 14 will understand how to scale the circuits to accommodate more than 2 mapped signals to each port.

The dual mode pinout memory controller embodiments can be used in any memory system, such as solid state memory systems including SSD drives and other portable memory storage devices. The dual mode pinout memory controller embodiments can further be integrated with systems that use non-volatile memory, such as in portable electronic devices including mobile phones, laptop computers and tablets by example.

In the embodiments described above, the device elements and circuits are connected to each other as shown in the figures, for the sake of simplicity. In practical applications of the present disclosure, elements, circuits, etc. may be connected directly to each other. As well, elements, circuits etc. may be connected indirectly to each other through other elements, circuits, etc., necessary for operation of devices and apparatus. Thus, in actual configuration, the circuit elements and circuits are directly or indirectly coupled with or connected to each other.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding.

The above-described embodiments are intended to be examples only. Alterations, modifications and variations can be effected to the particular embodiments by those of skill in the art without departing from the scope, which is defined solely by the claims appended hereto.

What is claimed is:

1. A dual interface flash memory controller, comprising:
  a NAND flash memory interface having
    a first memory interface port including a single pad for communicating information with a memory, the first memory interface port including circuitry configured to provide a first signal compatible for communicating with the memory configured for a multi-drop bus architecture in a first memory interface protocol and configured to receive a second signal compatible for communicating with the memory configured for a serial point-to-point bus architecture in a second memory interface protocol different than the first memory interface protocol, the circuitry including a first signal path configured to drive the first signal, and a second signal path configured to buffer the second signal;

a second memory interface port including first input circuitry configured for receiving an input signal corresponding to the first memory interface protocol from a second single pad, and second input circuitry configured for receiving another input signal corresponding to the second memory interface protocol from the second single pad;

mode selector circuitry for enabling the first signal path or the second signal path in response to an applied voltage level;

and, a host interface having host interface ports for communicating information between a host device and the memory controller.

2. The dual interface flash memory controller of claim 1, further including a pad electrically coupled to the mode selector circuitry for receiving the applied voltage level.

3. The dual interface flash memory controller of claim 1, further including a selector circuit for selectively coupling the second single pad to one of the first input circuitry or the second input circuitry in response to a selection signal having one of a first logic state and a second logic state provided by the mode selector circuitry.

4. The dual interface flash memory controller of claim 3, wherein the circuitry includes a third signal path configured to buffer a third signal, the third signal corresponding to the first memory interface protocol.

5. The dual interface flash memory controller of claim 4, wherein the third signal path includes output circuitry configured for providing an output signal corresponding to the memory interface protocol to the single pad.

6. The dual interface flash memory controller of claim 1, further including a third memory interface port including first output circuitry configured for providing an output signal corresponding to the first memory interface protocol to a third single pad, and second output circuitry configured for providing another output signal corresponding to the second memory interface protocol from the third single pad.

7. The dual interface flash memory controller of claim 1, further including a third memory interface port including input circuitry configured for receiving an input signal corresponding to the first memory interface protocol from a third single pad, and output circuitry configured for providing an output signal corresponding to the second memory interface protocol to the third single pad.

8. The dual interface flash memory controller of claim 7, further including a selector circuit for selectively coupling the third single pad to one of the input circuitry or the output circuitry in response to a selection signal having one of a first logic state and a second logic state provided by the mode selector circuitry.

9. The dual interface flash memory controller of claim 1, wherein the first memory interface protocol is an ONFi memory interface protocol and the second memory interface protocol is an HLNAND memory interface protocol.

10. The dual interface flash memory controller of claim 1, wherein the mode selector circuitry is configured to set the first memory interface port to operate with the first memory interface protocol for receiving and providing a data strobe signal in response to a first voltage, and to set the first memory interface port to operate with the second memory interface protocol for receiving a clock signal in response to a second voltage.

11. A non-volatile memory system, comprising:

a NAND flash memory controller including a channel control module having a first input/output port including a single pad with circuitry configured to provide a first signal corresponding to a first memory interface protocol pinout and configured to receive a second signal corresponding to a second memory interface protocol pinout, the circuitry including a first signal path configured to drive the first signal, and a second signal path configured to buffer the second signal;

a second input/output port including first input circuitry configured for receiving an input signal corresponding to the first memory interface protocol from a second single pad, and second input circuitry configured for receiving another input signal corresponding to the second memory interface protocol from the second single pad;

mode selector circuitry for enabling the first signal path or the second signal path in response to an applied voltage level;

and, at least one NAND flash memory configured for a multi-drop bus architecture or configured for a serial point-to-point bus architecture having either the first memory interface protocol pinout or the second memory interface protocol pinout in communication with the channel control module through the first input/output port and the second input/output port.

12. The non-volatile memory system of claim 11, further including a channel for electrically connecting the first input/output port and the second input/output port to the at least one NAND flash memory device.

13. The non-volatile memory system of claim 12, wherein the at least one NAND flash memory includes at least two NAND flash memory chips connected in parallel to the channel.

14. The non-volatile memory system of claim 12, wherein the at least one NAND flash memory includes at least two NAND flash memory chips connected in series in a ring topology configuration with the channel control module.

15. The non-volatile memory system of claim 11, wherein the first memory interface protocol pinout corresponds to an ONFi memory interface pinout and the second memory interface protocol pinout corresponds to an HLNAND memory interface pinout.

* * * * *